US012601462B2

(12) United States Patent
Dong et al.

(10) Patent No.: US 12,601,462 B2
(45) Date of Patent: Apr. 14, 2026

(54) OPTICAL SYSTEM FOR A LIGHTING DEVICE WITH A COLLIMATING LENS WITH A WELL

(71) Applicant: Lutron Technology Company LLC, Coopersburg, PA (US)

(72) Inventors: Fangxu Dong, Austin, TX (US); Dong Jenna Lu, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/827,342

(22) Filed: Sep. 6, 2024

(65) Prior Publication Data

US 2025/0075877 A1 Mar. 6, 2025

Related U.S. Application Data

(60) Provisional application No. 63/580,856, filed on Sep. 6, 2023.

(51) Int. Cl.

| | |
|---|---|
| *F21V 5/02* | (2006.01) |
| *F21V 3/02* | (2006.01) |
| *F21V 7/00* | (2006.01) |
| *F21V 13/04* | (2006.01) |
| *G02B 19/00* | (2006.01) |
| *F21Y 105/16* | (2016.01) |
| *F21Y 115/10* | (2016.01) |

(52) U.S. Cl.
CPC ................. *F21V 5/02* (2013.01); *F21V 3/02* (2013.01); *F21V 7/0091* (2013.01); *F21V*

*13/04* (2013.01); *G02B 19/0028* (2013.01); *F21Y 2105/16* (2016.08); *F21Y 2115/10* (2016.08)

(58) Field of Classification Search
CPC .. H10H 29/855; H10H 29/856; F21V 7/0091; F21V 3/02; F21V 13/04; F21V 5/04; G02B 19/0028
See application file for complete search history.

(56) References Cited

U.S. PATENT DOCUMENTS

| | | | |
|---|---|---|---|
| 9,360,174 | B2 | 6/2016 | Dong et al. |
| 9,458,972 | B1 | 10/2016 | Dong et al. |
| 9,500,324 | B2 | 11/2016 | Dong |
| 9,736,895 | B1 | 8/2017 | Dong et al. |

(Continued)

*Primary Examiner* — Tracie Y Green
*Assistant Examiner* — Michael Chiang
(74) *Attorney, Agent, or Firm* — Flaster Greenberg P.C.

(57) ABSTRACT

An optical system may comprise an emitter assembly and an optical structure that are configured to be used with a lighting device for providing a narrow beam angle for the lighting device. The emitter assembly may comprise an array of emitters configured to emit light. The optical structure may comprise a body having a light-entry portion, a light-exit portion, and side wall extending between the light-entry portion and the light-exit portion. The side wall of the optical structure may define a total internal reflection (TIR) surface. The light-exit portion may comprise a front surface and an octagon-shaped well formed into the front surface. The octagon-shaped well may have a center surface surrounded by a beveled portion configured to refract light that is reflected off of the TIR surface towards a central axis of the optical system, such that light rays that are transmitted from the light-exit portion are substantially collimated.

20 Claims, 17 Drawing Sheets

(56) References Cited

U.S. PATENT DOCUMENTS

| | | | |
|---|---|---|---|
| 9,903,561 B1 * | 2/2018 | Chen | F21S 8/00 |
| 10,161,786 B2 | 12/2018 | Chang et al. | |
| 10,422,509 B2 * | 9/2019 | Ebner | G02B 19/0028 |
| 10,591,134 B2 | 3/2020 | Dong | |
| 10,697,611 B2 * | 6/2020 | Sayers | G02B 19/0028 |
| 10,935,228 B2 | 3/2021 | Bocock et al. | |
| RE48,712 E * | 8/2021 | Dong | F21V 13/04 |
| 11,079,091 B2 * | 8/2021 | Shah | G02B 19/0052 |
| 11,106,025 B2 | 8/2021 | Dong | |
| 11,251,347 B2 * | 2/2022 | Streppel | H10H 20/855 |
| 11,570,874 B2 | 1/2023 | Bocock et al. | |
| 11,614,206 B2 | 3/2023 | Dong | |
| 11,686,453 B2 * | 6/2023 | Bu | G02B 19/0061 |
| | | | 362/296.01 |
| 2005/0152153 A1 * | 7/2005 | Amano | F21S 43/26 |
| | | | 362/520 |
| 2009/0201677 A1 * | 8/2009 | Hoelen | F21S 10/02 |
| | | | 362/231 |
| 2015/0260905 A1 * | 9/2015 | Yuan | G02B 6/32 |
| | | | 362/616 |
| 2015/0354780 A1 * | 12/2015 | Wang | F21K 9/23 |
| | | | 362/334 |
| 2023/0417394 A1 * | 12/2023 | Orbe | G02B 19/0028 |

* cited by examiner

100

110

130

122

120

OPTICAL SYSTEM FOR A LIGHTING DEVICE WITH A COLLIMATING LENS WITH A WELL

CROSS-REFERENCE TO RELATED APPLICATIONS

This application claims the benefit of Provisional U.S. Patent Application No. 63/580,856, filed Sep. 6, 2023, the entire disclosures of which are hereby incorporated by reference herein in their entirety.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

SUMMARY

As described herein, an optical system may comprise an emitter assembly and an optical structure that are configured to be used with a lighting device for providing a narrow beam angle for the lighting device. The emitter assembly may comprise an array of emitters configured to emit light, wherein the array of emitters may be characterized by an area that may be centered about a central axis of the optical system. The optical structure may comprise a body having a light-entry portion configured to receive the light emitted by the emitter, a light-exit portion, and side wall extending between the light-entry portion and the light-exit portion. The body of the optical structure may be centered about the central axis of the optical system. The side wall of the optical structure may define a first total internal reflection (TIR) surface within the body of the optical structure, where the first TIR surface may be configured to reflect light emitted by the emitter towards the light-exit portion.

The light-entry portion of the optical structure may define a recess in the body of the optical structure and a projection extending from the body into the recess. The projection may comprise a side wall that defines a second TIR surface within the body of the optical structure, the second TIR surface configured to reflect light emitted by the emitter assembly towards the light-exit portion (e.g., to provide a narrow beam angle for the lighting device).

In addition, the light-exit portion may comprise a front surface and an octagon-shaped well formed into the front surface. The octagon-shaped well may comprise a center surface surrounded by a beveled portion that is configured to refract light that is reflected off of the first TIR surface towards the central axis of the optical system, such that light rays that are transmitted from the light-exit portion are substantially collimated.

In some examples, the octagon-shaped well defines an opening in the front surface of the light-exit portion. The opening may have four long sides and four short sides that alternate, such that each of the short sides is connected between two of the long sides. For example, each of the long sides may be straight and parallel to a respective side of the array of the emitters. In some examples, each of the short sides bisects a corner of a square formed by the long sides. Each of the short sides may be straight or curved.

The octagon-shaped well may include a side wall extending between the front surface of the light-exit portion and the beveled portion of the octagon well. The side wall may be perpendicular to the front surface of the light-exit portion, such that the side wall is aligned with the long sides and the short sides of the opening defined by the octagon-shaped well. The side wall may be configured to offset the beveled portion from the front surface of the light-exit portion to position the beveled portion to reflect light that is reflected off of the TIR surface towards the central axis of the optical system, such that light rays that are transmitted from the light-exit portion are substantially collimated.

The beveled portion of the octagon-shaped well may be flat and oriented at an angle with respect to the central axis. For example, the front surface of the light-exit portion and the center surface of the octagon-shaped well are both flat.

In some examples, the array of emitters of the emitter assembly are mounted to a substrate.

Further, the emitter assembly may comprise an optical element (e.g., a dome) mounted over the array of emitters for conducting light emitted by the emitters. The optical element may define a circular periphery that surrounds the area of the array of emitters. The optical element may comprise a first circular portion centered about the central axis of the optical system and having dome shape for increasing an amount of light emitted by the array of emitters that is transmitted from the optical element within the first portion. The optical element may further comprise a second circular portion located around the first circular portion and extending towards a substrate on which the array of emitters are mounted. The second circular portion may have a substantially flat or convex shape and may be configured to spread light that is transmitted from the optical element within the second circular portion away from the central axis of the optical system, so as to reduce an apparent size of the area of the array of emitters of the emitter assembly.

The TIR surface may include a first TIR surface. The light-entry portion of the optical structure may define a recess in the body of the optical structure and a projection extending from the body into the recess, the projection comprising a side wall that defines a second TIR surface within the body of the optical structure. The second TIR surface may be configured to reflect light emitted by the array of emitters towards the light-exit portion. The array of emitters may be characterized by an area that is square shaped.

An optical system may include an emitter configured to emit light, and an optical structure. The optical structure may include a body having a light-entry portion configured to receive the light emitted by the emitter, a light-exit portion, and a side wall extending between the light-entry portion and the light-exit portion. The side wall may define a first total internal reflection (TIR) surface within the body of the optical structure. The first TIR surface may be configured to reflect light emitted by the emitter towards the light-exit portion. The light-entry portion of the optical structure may define a recess in the body of the optical structure and a projection extending from the body into the recess. The projection may include a side wall that defines a second TIR surface within the body of the optical structure. The second TIR surface may be configured to reflect light emitted by the emitter towards the light-exit portion.

In some examples, the emitter is mounted to a substrate. The optical system may include an emitter assembly that includes the emitter. The emitter may include an array of emitters mounted to the substrate. The emitter assembly may include an optical element mounted over the array of emitters for conducting light emitted by the array of emitters. The optical element may define a circular periphery that surrounds an area of the array of emitters. The optical element may include a first portion, such as a first circular portion, and a second portion, such as a second circular portion. The first circular portion may be centered about a central axis of the optical system and have a dome shape for increasing an amount of light emitted by the array of emitters that is transmitted from the optical element within the first portion. The second circular portion may be located around the first circular portion and extend towards the substrate on which the array of emitters are mounted. The second circular portion may have a substantially flat or convex shape. The second circular portion may be configured to spread light that is transmitted from the optical element within the second circular portion away from the central axis of the optical system, so as to reduce an apparent size of the area of the array of emitters of the emitter assembly.

The light-exit portion may include a front surface and an octagon-shaped well formed into the front surface. The octagon-shaped well may include a center surface surrounded by a beveled portion that is configured to refract light that is reflected off of the first TIR surface towards a central axis of the optical system, such that light rays that are transmitted from the light-exit portion are substantially collimated. The side wall of the projection may reside within the side wall of the body, such that the second TIR surface resides within the body. The projection may have a smaller circumference than the body.

In some examples, the projection may define one or more circumferences, the body may define one or more circumferences, and the one or more circumferences of the projection are smaller than one or more circumferences of the body. In some examples, the side wall that defines the second TIR surface has a smaller circumference than the side wall that comprises the first TIR surface. The first TIR surface may include, or define, a plurality of facets.

An emitter assembly may include one or more emitters mounted to a board and that are configured to emit light. The one or more emitters may be mounted within an area on the board. The emitter assembly may include an optical element mounted over the one or more emitters for conducting light emitted by the one or more emitters. The optical element may define a circular periphery that surrounds the area on the board in which the one or more emitters are mounted. The optical element may include a first circular portion located at a center of the optical element and having a dome shape for increasing an amount of light emitted by the one or more emitters that is transmitted from the optical element within the first portion. The optical element may include a second circular portion located around the first circular portion and extending towards the board on which the one or more emitters are mounted. The second circular portion may have a substantially flat or convex shape and configured to spread light that is transmitted from the optical element within the second portion away from the center of the optical element, so as to reduce an apparent size of the area of the emitters mounted to the board.

The one or more emitters may be mounted to the board in an array characterized by an area. An apparent size of the array of emitters as magnified by the optical element may be less than or equal to 10% of an actual size of the array of emitters. In some examples, the board comprises a substrate.

An emitter assembly may include one or more emitters mounted to a board and configured to emit light, the one or more emitters mounted within an area on the board. The emitter assembly may include an optical element mounted over the one or more emitters for conducting light emitted by the one or more emitters. The optical element may define a circular periphery that surrounds the area on the board in which the one or more emitters are mounted. The optical element may include a first portion located having a dome shape for increasing an amount of light emitted by the one or more emitters that is transmitted from the optical element within the first portion. The optical element may include a second portion located having a substantially flat or convex shape and configured to spread light that is transmitted from the optical element within the second portion away from the center of the optical element, so as to reduce an apparent size of the area of the emitters mounted to the board.

The first portion may be centered about a central axis of the optical element. The second portion may be located around the first portion and extends towards the board on which the one or more emitters are mounted. The first portion may define a circular periphery defined by a first boundary. The second portion may define a circular inner periphery defined by the first boundary and a circular outer periphery defined by a second boundary. The second portion may extend between the first boundary and the second boundary. The optical element may include a third portion that is located around the second portion. The third portion may define a circular inner periphery defined by the second boundary and a circular outer periphery that is aligned with an outer periphery of the dome. In some examples, the third portion extends between the second boundary and an outer periphery of the optical element. The third portion may define a curved shape between the second boundary and the outer periphery of the dome.

The first portion may be located at a center of the optical element and has a dome shape for increasing an amount of light emitted by the one or more emitters that is transmitted from the optical element within the first portion as compared to an optical element that does not include the first circular portion. The optical element may include an outer surface that is defined by a first concave portion and a second convex portion.

An emitter assembly may include one or more emitters mounted to a board and configured to emit light, the one or more emitters mounted within an area on the board. The emitter assembly may include an optical element mounted over the one or more emitters for conducting light emitted by the one or more emitters. The optical element may define a periphery that surrounds the area on the board in which the one or more emitters are mounted. The optical element may include an outer surface that is defined by a first concave portion and a second convex portion. In some examples, the periphery of the optical element is circular in shape.

DETAILED DESCRIPTION

Figure 1:
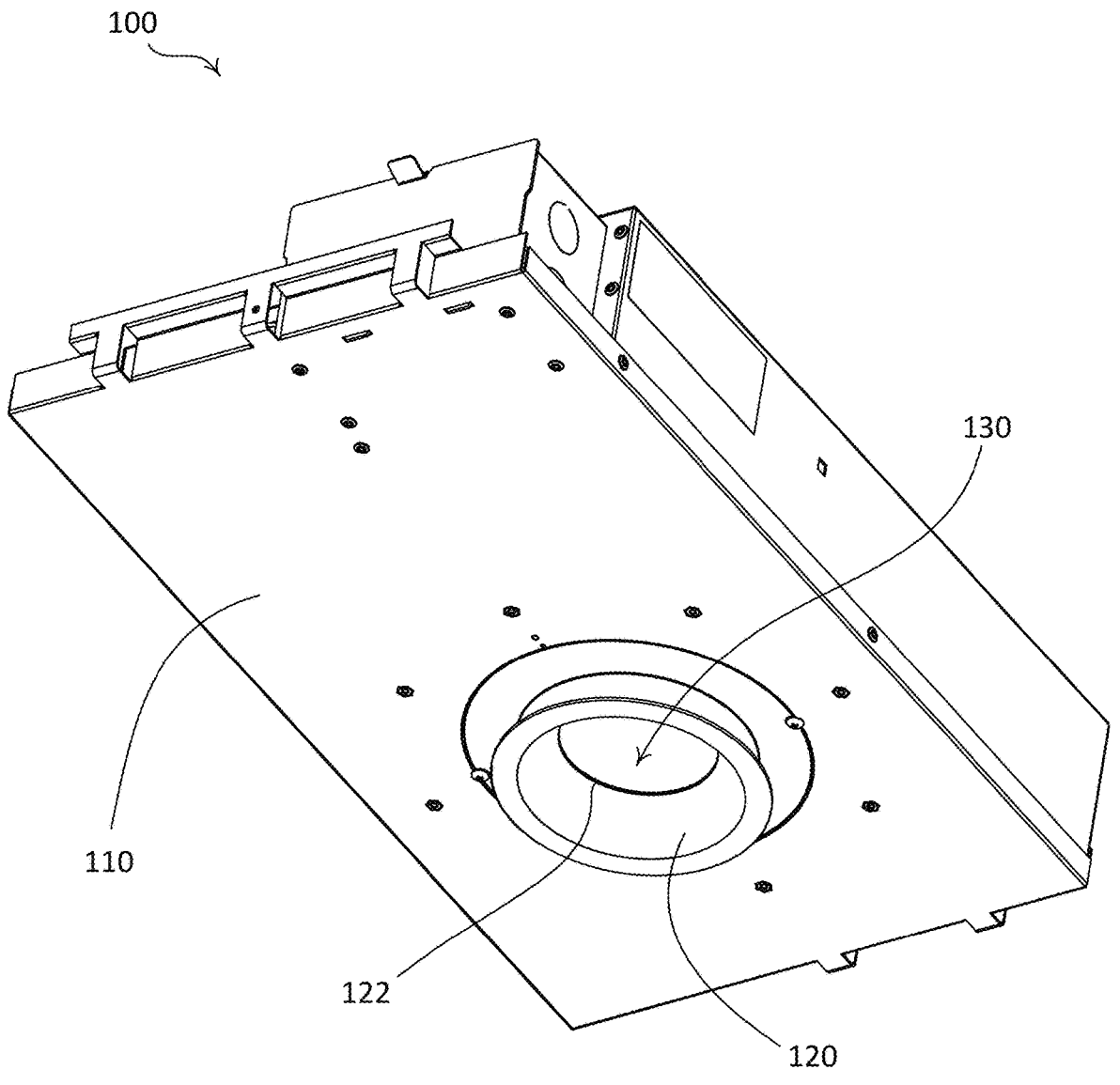
FIG. 1 is a perspective view of an example lighting device.

FIG. 1 is a perspective view of an example illumination device, such as a lighting device 100 (e.g., a downlight fixture). The lighting device 100 may include a housing 110 (e.g., an enclosure), a trim 120, and a lighting device assembly 130. The housing 110 may be configured to enclose the lighting device assembly 130, and at least a portion of the trim 120. The housing 110 may be configured to be installed within a structure (e.g., a ceiling). When the housing 110 is installed within the structure, at least a portion of the trim 120 may extend from the structure. The trim 120 may be configured to cover (e.g., hide from view) an opening in the housing 110. The housing 110 may be configured to receive various trims (e.g., such as the trim 120) with varying physical properties. The trim 120 may define an aperture 122 of the lighting device 100 through which the lighting device assembly 130 may be configured to emit light. The aperture 122 of the lighting device 100 may be characterized by an aperture size, which may be, for example, a diameter $D_{APERTURE}$ of the aperture 122 (e.g., approximately 2-3 inches).

Figure 2:
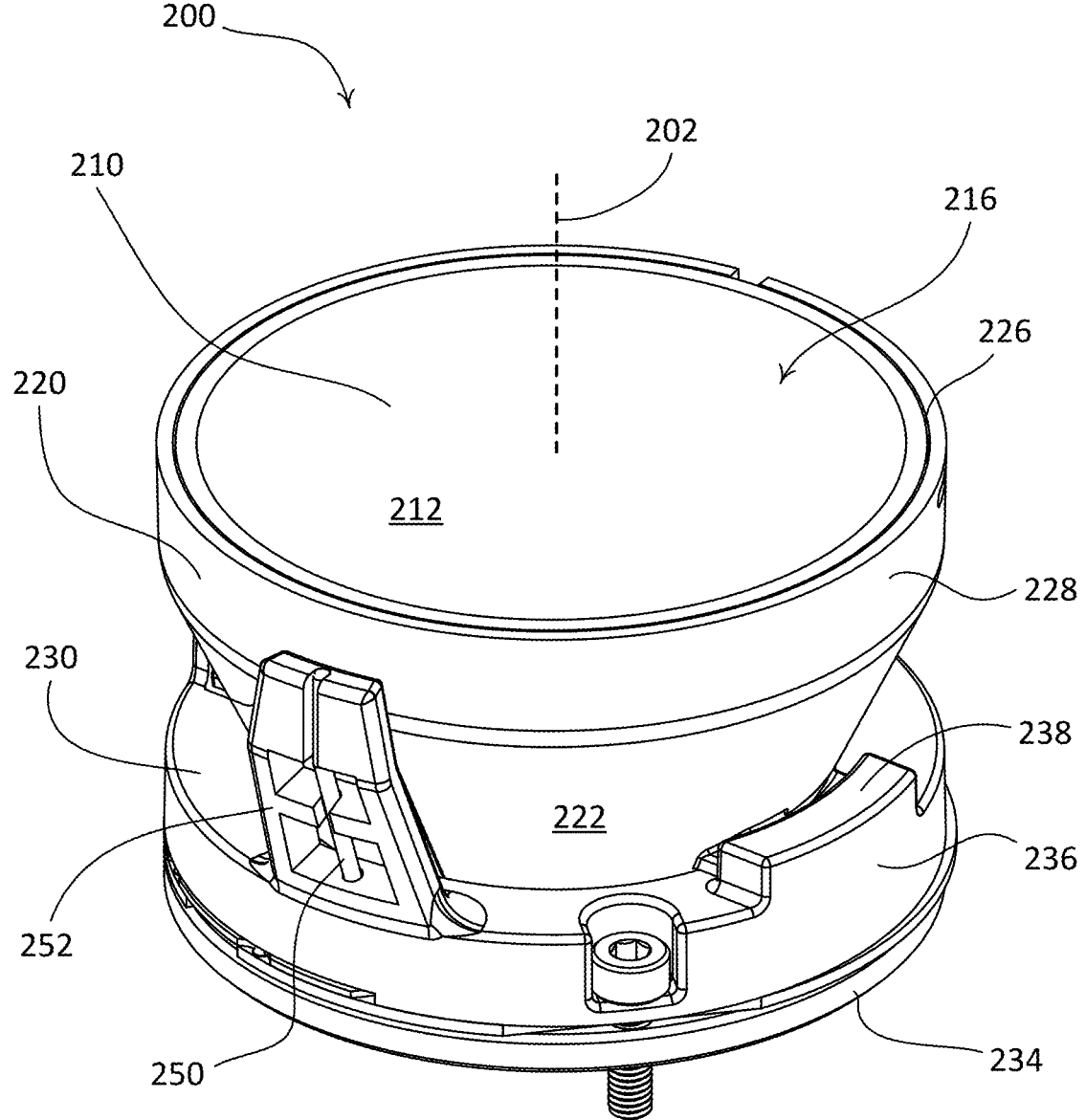
FIG. 2 is a perspective view of an example lighting device assembly, which may be deployed as part of the lighting device shown in FIG. 1.
Figure 3:
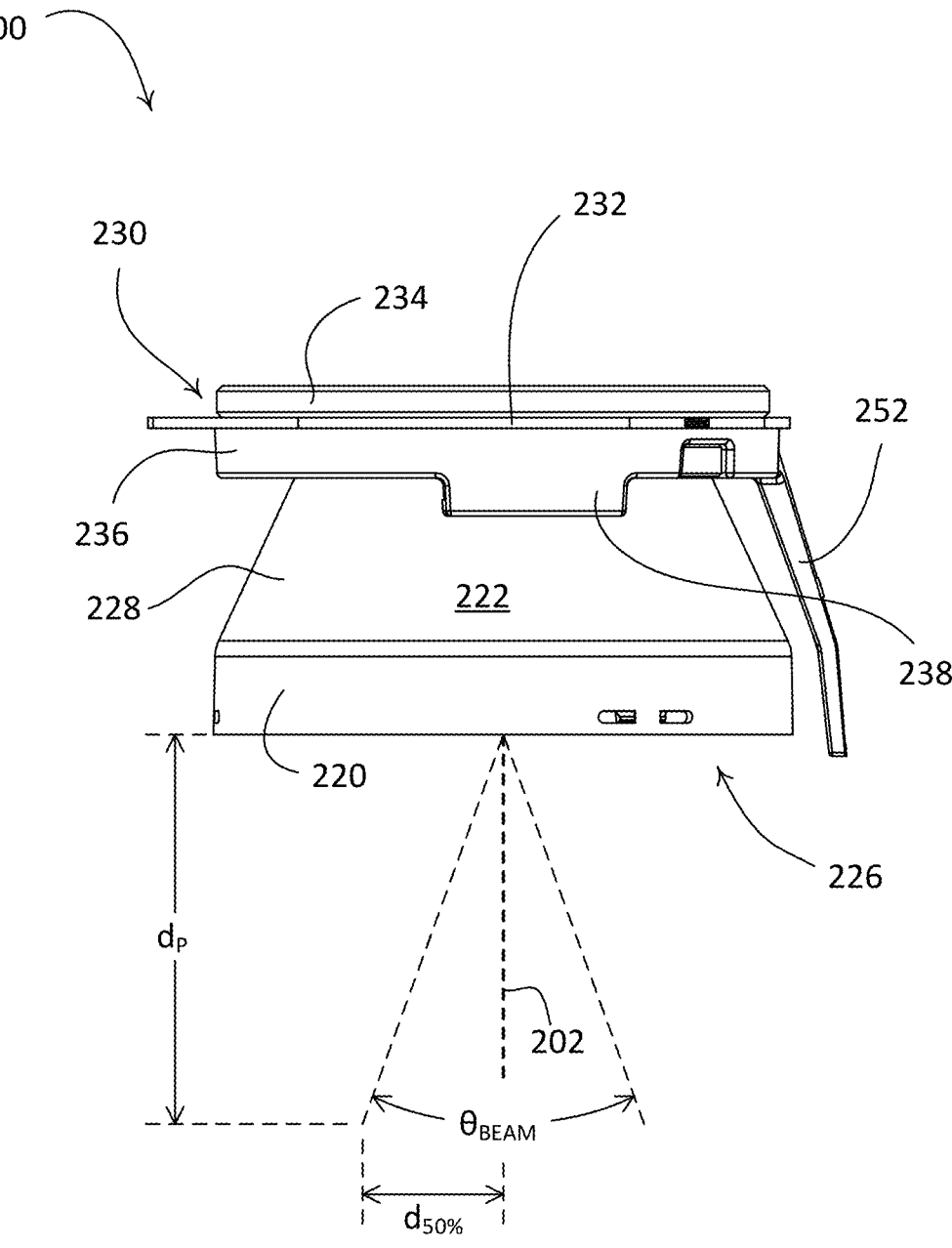
FIG. 3 is a side view of the lighting device assembly of FIG. 2.
Figure 4:
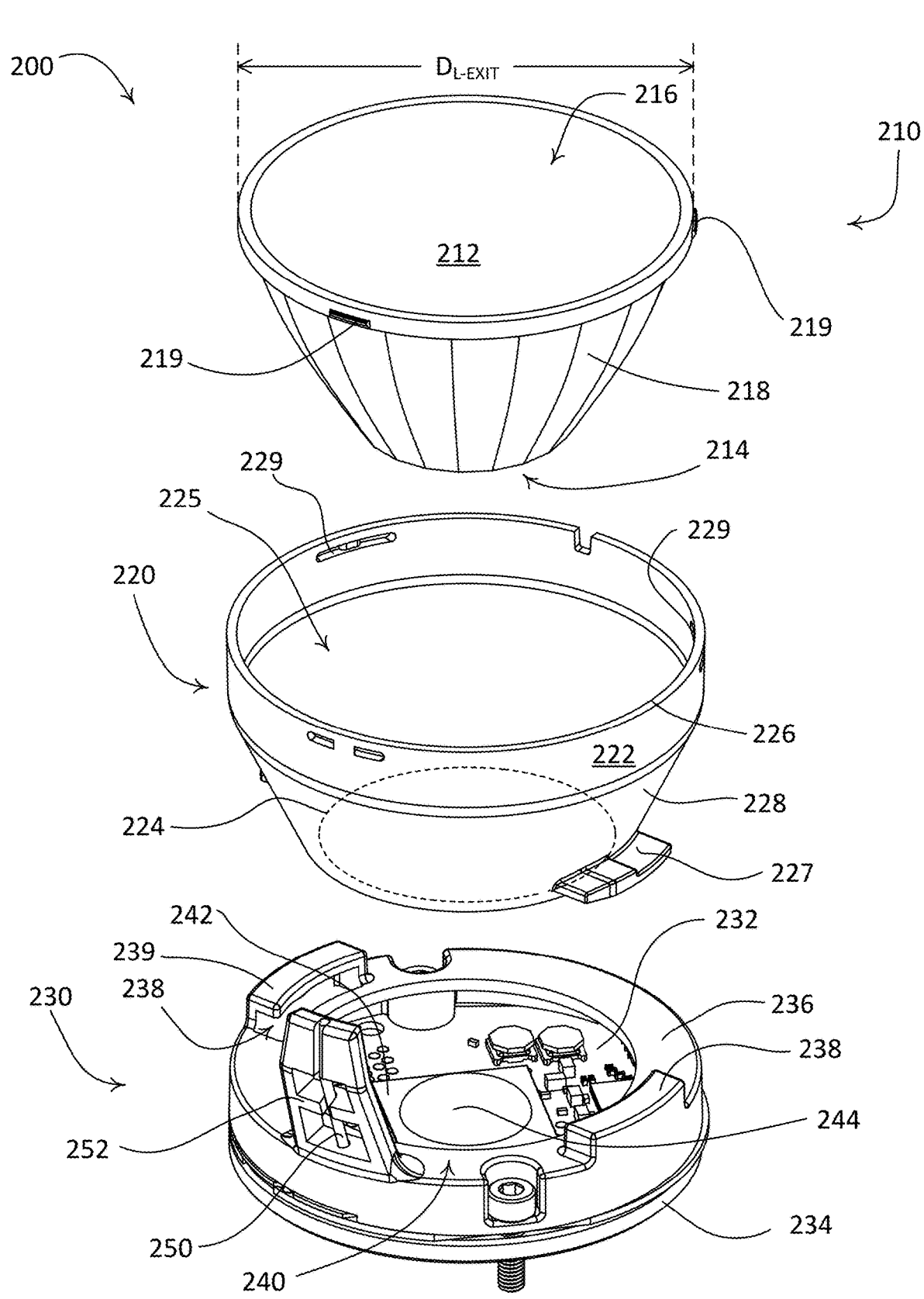
FIG. 4 is an exploded view of the lighting device assembly of FIG. 2.

FIG. 2 is a perspective view of an example lighting device assembly 200 for a lighting device, which may be deployed as the lighting device assembly 130 of the lighting device 100 shown in FIG. 1. FIG. 3 is a side view of the lighting device assembly 200 shown in an orientation in which the lighting device assembly 200 may be oriented when the lighting device assembly 200 is mounted in the lighting device. FIG. 4 is an exploded view of the lighting device assembly 200. The lighting device assembly 200 may comprise an optical structure 210 (e.g., a lens), a reflector 220, and a light-generation module 230. The light-generation module 230 may comprise a printed circuit board 232, a heat sink 234, and a socket 236. The light-generation module 230 may include an emitter assembly 240 (e.g., an emitter module) having one or more emitters, such as light-emitting diodes (LEDs) (not shown) and/or one or more detectors (e.g., detection LEDs) mounted to a substrate 242, which may be mounted to the printed circuit board 232. The printed circuit board 232 also may have mounted thereto electrical circuitry including one or more drive circuits for controlling the amount of power delivered to the emitters of the emitter assembly 240, one or more control circuits for controlling the drive circuits, and one or more wireless communication circuits for communicating wireless signals (e.g., radio-frequency (RF) signals) with external devices. The printed circuit board 232 may be located between the heat sink 234 and the socket 236. The socket 236 may at least partially enclose the printed circuit board 232. The socket 236 may define two or more connectors 238 that each define a respective slot 239 in which a respective tab 227 of the reflector 220 may be received for connecting the reflector 220 to the light-generation module 230. The lighting device assembly 200 may define a central axis 202 about which the optical structure 210, the reflector 220, and the emitter assembly 240 of the light-generation module 230 may be centered.

The emitter assembly 240 may include an optical element, such as a dome 244 that is configured to enclose the one or more emitters and the one or more detectors mounted to the substrate 242. The emitters of the emitter assembly 240 may be configured to emit light (e.g., through the dome 244). The substrate 242 may be a ceramic substrate formed from an aluminum nitride or an aluminum oxide material or some other reflective material, and may function to improve output efficiency of the emitter assembly 240 by reflecting light out of the dome 244. The dome 244 may include an optically-transmissive material, such as silicon or the like, and may be formed through an over-molding process, for example. A surface of the dome 244 may be textured (e.g., lightly textured), for example, to increase light scattering and promote color mixing, as well as to reflect a portion (e.g., a small amount) of the emitted light back toward the detectors mounted on the substrate 242, e.g., about 5% (e.g., when the detectors are included). The emitters of the emitter assembly 240 may be thermally coupled to the heat sink 234 via the substrate 242 and the printed circuit board 232. The heat sink 234 may be configured to dissipate heat generated by the emitters of the emitter assembly 240. A thermally-conductive substance may be disposed between the printed circuit board 232 and the heat sink 234.

The light generation module 230 may also comprise an antenna 250 that may be electrically coupled to the one or more wireless communication circuits mounted to the printed circuit board 232. The one or more wireless communication circuit may be configured to transmit and/or receive wireless control signals from/to external control devices via the antenna 250. For example, the wireless communication circuit(s) may include a radio-frequency (RF) transceiver coupled to the antenna 250 for transmitting and/or receiving RF signals. In addition, the wireless communication circuit(s) may be an RF transmitter for transmitting RF signals and an RF receiver for receiving RF signals. The antenna 250 may be held in place by an antenna holder 252. The antenna holder 252 may be connected to the printed circuit board 232 and/or the socket 236. As another example, the wireless communication circuit(s) may be an infrared (IR) transmitter and/or receiver for transmitting and/or receiving IR signals.

The optical structure 210 may comprise a body 212 having a light-entry portion 214, a light-exit portion 216, and a side wall 218. For example, the side wall 218 may define a total internal reflection (TIR) surface (not shown) within the body 212 of the optical structure 210. The side wall 218 may be smooth and/or may be faceted as shown in FIG. 4, although other variations are possible. The reflector 220 may comprise a body 222 (e.g., a conically-shaped body) having a first opening 224 (e.g., which is illustrated as a dashed line in FIG. 4), a second opening 226, and a side wall 228. The body 222 of the reflector 220 may define a cavity 225 (FIG. 4) in which the optical structure 210 may be received (e.g., as shown in FIG. 2). The optical structure 210 may comprise tabs 219 configured to be received in corresponding recesses 229 in the reflector 220 for holding the optical structure 210 within the cavity 225 of the reflector 220.

When the lighting device assembly 200 is assembled (e.g., as shown in FIGS. 2 and 3), the emitters of the emitter assembly 240 may be configured to emit light through the dome 244 and the first opening 224 of the reflector 220, and onto the light-entry portion 214 of the optical structure 210. The optical structure 210 may be configured to conduct the light received by the light-entry portion 214 towards the light-exit portion 216, such that the light may shine through the second opening 226 of the reflector 220. For example, the light-exit portion 216 of the optical structure 210 may be circular to match a circular shape of the second opening 226 of the reflector 220. The TIR surface defined by the side wall 218 of the optical structure 210 may be configured to reflect light towards the light-exit portion 216 (e.g., as will be described in greater detail below). In some examples, the TIR surface may defined by the side wall 218 of the optical structure 210 reflect all (e.g., substantially all) of the light off the TIR surface within the body 212, and towards the second opening 226. In addition, the reflector 220 may be configured to reflect the light towards the light-exit portion 216 of the optical structure 210.

The optical structure 210, the reflector 220, and the emitter assembly 240 (e.g., including the emitters and the dome 244) may form an optical system of the lighting device in which the lighting device assembly 200 is installed (e.g., the lighting device 100 shown in FIG. 1). For example, the light-exit portion 216 may be characterized by a diameter $D_{L\text{-}EXIT}$ (e.g., as shown in FIG. 4) which may be approximately equal to an aperture size of the lighting device (e.g., a diameter $D_{APERTURE}$ of the aperture 122 of the lighting device 100). When the aperture size of the lighting device (e.g., the diameter $D_{APERTURE}$ of the aperture 122 of the lighting device 100) is small (e.g., approximately 2 inches), the diameter $D_{L\text{-}EXIT}$ of the optical structure 210 may also be small (e.g., approximately 2 inches), which may limit the overall size of the optical structure 210.

The lighting device assembly 200 may be characterized by a beam angle $\theta_{BEAM}$ (e.g., as shown in FIG. 3). The beam angle $\theta_{BEAM}$ define the size of a cone of light that extends from the lighting device assembly 200 and is centered about the central axis 202, where a lighting intensity (e.g., brightness) of the light within the cone of the light does not drop below 50% of a peak lighting intensity level of the light within the cone. Stated differently, the beam angle $\theta_{BEAM}$ may be determined by measuring a distance $d_{50\%}$ from the central axis 202 at which the lighting intensity level of the light emitted by the lighting device assembly 200 is approximately 50% of the peak lighting intensity level of the light emitted by the lighting device assembly 200 at a particular distance $d_P$ (e.g., approximately 8 feet) from the lighting device assembly 200, e.g., $$\theta_{BEAM}=2\cdot\arctan(d_{50\%}/d_P).$$

One or more characteristics of the optical structure 210 may be adjusted to change the beam angle $\theta_{BEAM}$ of the lighting device assembly 200 (e.g., as will be described in greater detail below). Accordingly, the lighting device assembly 200 may be installed with different optical structures to provide different values for the beam angles $\theta_{BEAM}$ of the lighting device assembly 200.

Figures 5, 6:
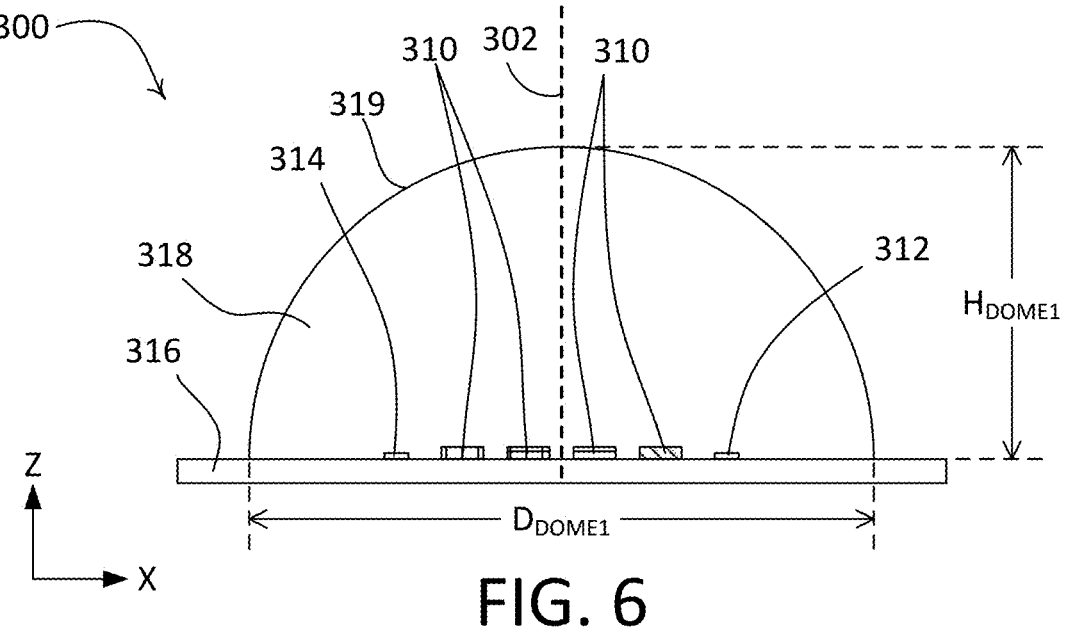
FIG. 5 is a top view of an example emitter assembly of a lighting device assembly, such as the lighting device assembly shown in FIG. 2.
FIG. 6 is a side cross-section view of the emitter assembly of FIG. 5 taken through the center of the emitter assembly.

FIG. 5 is a top view of an example emitter assembly 300 (e.g., an emitter module) of a lighting device, which may be deployed as an emitter assembly of the lighting device 100 shown in FIG. 1 and/or the emitter assembly 240 of the lighting device assembly 200 shown in FIG. 2. FIG. 6 is a side cross-section view of the emitter assembly 300 taken through the center of the emitter assembly 300 (e.g., through the line shown in FIG. 5). The emitter assembly 300 may comprise an array 311 of emitters 310 (e.g., emission LEDs). In some examples, the emitter assembly 300 may also include (e.g., optionally include) one or more detectors 312, 314 (e.g., detection LEDs) located next to the array 311 of emitters 310. For example, the emitter assembly 300 may comprise sixteen emitters 310 and eight detectors 312, 314, although other variations are possible. In some examples, the emitter assembly 300 may include more or less emitters 310 and more or less detectors 312, 314 than shown in FIG. 5. In addition, different configurations of the emitters 310 and/or the detectors 312, 314 may be used.

The emitters 310 and the detectors 312, 314 may be mounted to a substrate 316 (e.g., a board) and may be encapsulated by an optical element, such as a dome 318. For example, the substrate 316 may be a ceramic substrate formed from an aluminum nitride or an aluminum oxide material or some other reflective material. In addition, the substrate 316 may comprise a printed circuit board (PCB), such as a rigid PCB (e.g., made from an FR4 material) and/or a metal core PCB. The array 311 of the emitters 310 may be located within an area $A_{ARRAY}$, which may be shaped as, for example, a square (e.g., square shaped). For example, the array 311 of the emitters 310 (e.g., the area $A_{ARRAY}$) may have sides having respective lengths that are each equal to a distance $d_{ARRAY}$ (e.g., approximately 6.2 millimeters). The dome 318 may have an outer periphery 315 that surrounds the emitters 311 and the detectors 312, 314 (e.g., as shown in FIG. 5). The emitter assembly 300 may define a central axis 302 about which the area $A_{ARRAY}$ of the array 311 of the emitters 310 and the dome 318 may be centered.

The emitter assembly 300 may include multiple "chains" of the emitters 310 (e.g., series-coupled emitters). The emitters 310 of each chain may be coupled in series and may conduct the same drive current. Each chain may include emitters 310 that produce illumination at the same peak emission wavelength (e.g., emit light of the same color). The emitters 310 of different chains may emit light of different colors. For example, the emitter assembly 300 may comprise four differently-colored chains of emitters 310 (e.g., red, green, blue, and white or yellow). The array 311 of the emitters 310 may include a chain of four red emitters, a chain of four green emitters, a chain of four blue emitters, and a chain of four white or yellow emitters. The individual emitters 310 in each chain may be scattered about the array, and arranged so that no color appears twice in any row, column, or diagonal, to improve color mixing within the emitter assembly 300. Other variations of numbers of the emitters 310 per chain, the colors of the emitters 310, the numbers of the colors of the emitters 310, the number of chains of the emitters 310, etc., may be used. In addition, patterns other than a square array may be used. Other variations are possible.

The detectors 312, 314 may be located in pairs close to each edge of the array 311 of the emitters 310 and/or and in the middle of the array 311 of the emitters 310 as shown in FIG. 5. Similar to the emitters 310, the detectors 312, 314 may be LEDs that can be used to emit or receive optical or electrical signals. When the detectors 312, 314 are coupled to receive optical signals and emit electrical signals, the detectors may produce currents indicative of incident light from, for example, an emitter, a plurality of emitters, or a chain of emitters. The detectors 312, 314 may be any devices that produce currents indicative of incident light, such as a silicon photodiode or an LED. For example, the detectors 312, 314 may each be an LED having a peak emission wavelength in the range of approximately 550 nm to 700 nm, such that the detectors may not produce photocurrent in response to infrared light (e.g., to reduce interference from ambient light). For example, the first detector 312 of each pair of detectors may comprise a small red, orange or yellow LED, which may be used to measure a luminous flux of the light emitted by the red LEDs of the emitters 310. The second detector 314 may comprise a green LED, which may be used to measure a respective luminous flux of the light emitted by each of the green and blue LEDs of the emitters 310. Both of the first and second detectors 312, 314 may be used to measure the luminous flux of the white LED of the emitters 310 at different wavelengths (e.g., to characterize the spectrum of the light emitted by the white LED). The first detectors 312 may be coupled in parallel in the emitter assembly 300. Similarly, the second detectors 314 may be coupled in parallel in the emitter assembly 300. Other variations are possible.

The dome 318 may comprise, for example, an optically-transmissive material (e.g., a translucent and/or transparent material), such as silicon or the like, and may be formed through an over-molding process, for example. The dome 318 may be a solid structure comprising the optically-transmissive material filled in between the substrate 316 and an outer surface 319 of the dome 318. The outer surface 319 of the dome 318 may be textured (e.g., lightly textured), for example, to increase light scattering and promote color mixing, as well as to reflect a portion (e.g., a small amount) of the light emitted by the emitters 310 back toward the detectors 312, 314 mounted on the substrate 316, e.g., about 5% (e.g., when the detectors 312, 314 are included). The dome 318 may be characterized by a diameter $D_{DOME1}$ (e.g., approximately 16 millimeters) in a plane of the emitters 310, where the diameter $D_{DOME1}$ may be generally dependent on the size of the array 311 of emitters 310 (e.g., the distance $d_{ARRAY}$). The dome 318 may be characterized by a height $H_{DOME1}$, which may be approximately equal to half of the diameter $D_{DOME1}$ of the dome 318 (e.g., approximately 8 millimeters). For example, the dome 318 may have a curved profile, such that the dome 318 may be approximately a hemisphere (e.g., have a hemispherical shape). The emitters 310, the detectors 312, 314, the substrate 316, and the dome 318 may form an optical system. The array 311 of emitters 310 may be located as close as possible together to the central axis 302 of the emitter assembly 300, so as to approximate a centrally-located point source.

Figures 7, 8:
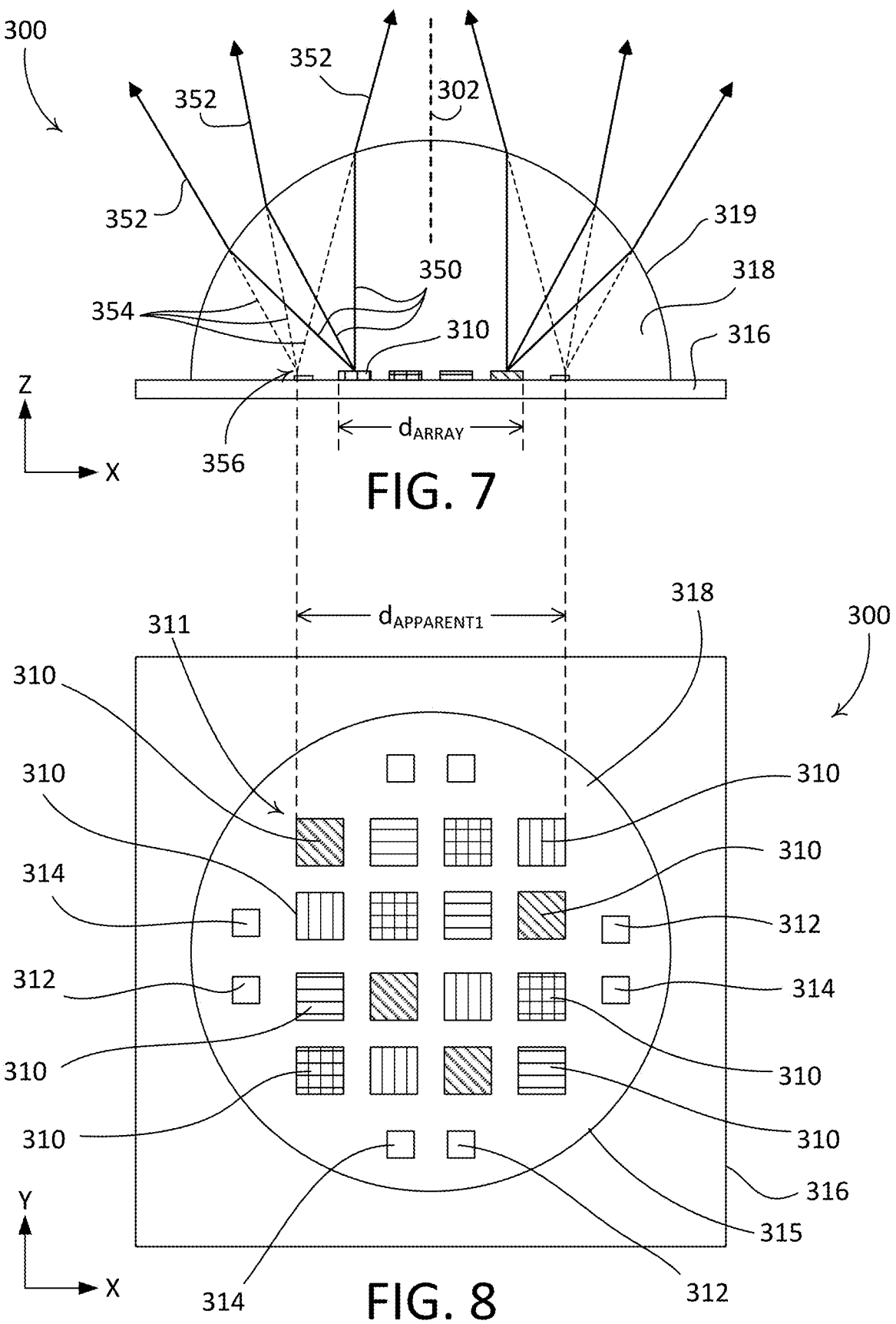
FIG. 7 is another side cross-section view of the emitter assembly of FIG. 5 illustrating some rays of light that may be emitted by one or more emitters of the emitter assembly.
FIG. 8 is a top view of the emitter assembly of FIG. 7 illustrating a magnified appearance of the emitters when a dome of the emitter assembly is shaped as a hemisphere.

FIG. 7 is another side cross-section view of the emitter assembly 300 illustrating some rays of light that may be emitted by one or more of the emitters 310 of the emitter assembly 300. For example, the left-most emitter 310 shown in FIG. 7 may emit light which may be conducted through the dome 318 as interior rays 350. At the outer surface 319 of the dome 318, the light of the interior rays 350 may be refracted, such that external rays 352 may propagate through the air external to the dome. For example, the light of the interior rays 350 may be refracted at the outer surface 319 of the dome 318 such that the external rays 352 are "bent" towards the central axis 302 of the emitter assembly 300.

When the dome 318 is shaped as a hemisphere, the dome 318 may be configured to magnify the emitters 310 (e.g., when the emitters 310 are viewed from above the dome 318). FIG. 8 is a top view of the emitter assembly 300 illustrating a magnified appearance of the emitters 310 of the array 311 of the emitters 310 and of the detectors 312, 314 when the dome 318 is shaped as a hemisphere. For example, the magnified appearance of the array 311 of emitters 310 may have sides with respective apparent lengths that are each equal to a distance $d_{APPARENT1}$ (e.g., approximately 8.7 millimeters), where the distance $d_{APPARENT1}$ (e.g., the apparent distance) is larger than the distance $d_{ARRAY}$ (e.g., the actual distance) of the actual lengths of the sides of the array 311 of the emitters 310. FIG. 7 also shows apparent path of the rays 354 that may illustrate the magnification of the array 311 of the emitters 310 when the dome 318 is shaped as a hemisphere. For example, the apparent path of the rays 354 may extend in the same direction as the external rays 352 internal to the dome 318. The apparent path of the rays 354 may meet at a point 356 that defines an end of one of the sides of the magnified appearance of the array 311 of the emitters 310 (e.g., one end of the distance $d_{APPARENT1}$).

Figures 9, 10:
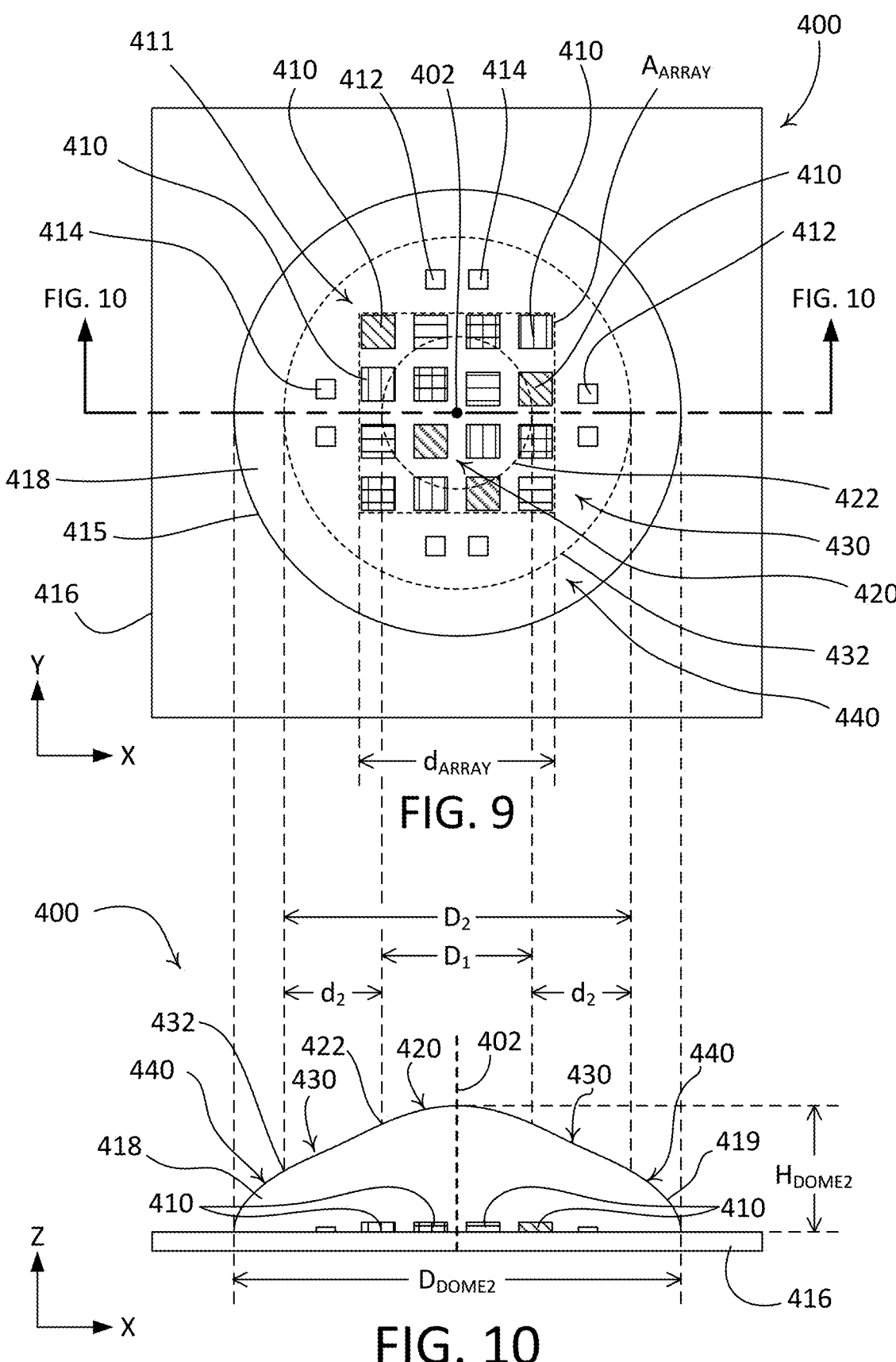
FIG. 9 is a top view of another example emitter assembly of a lighting device assembly, such as the lighting device assembly shown in FIG. 2.
FIG. 10 is a side cross-section view of the emitter assembly of FIG. 9 taken through the center of the emitter assembly.

It may be desirable to decrease the apparent lengths of the sides of the magnified appearance of the array 311 of emitters 310 (e.g., such that the emitter assembly 300 more appropriately approximates a point source). FIGS. 9 and 10 illustrate another example emitter assembly 400 (e.g., an emitter module) of a lighting device (e.g., an emitter assembly of the lighting device 100 and/or the emitter assembly 240 of the lighting device assembly 200) that may be configured to reduce an apparent size of an array 411 of emitters 410 (e.g., emission LEDs) of the emitter assembly 400. FIG. 9 is a top view of the emitter assembly 400. FIG. 10 is a side cross-section view of the emitter assembly 400 taken through the center of the emitter assembly 400 (e.g., through the line shown in FIG. 9). In some examples, the emitter assembly 400 may also include (e.g., optionally include) one or more detectors 412, 414 (e.g., detection LEDs). For example, the array 411 of the emitters 410 and the detectors 412, 414 may be identical to the array 311 of the emitters 310 and the detectors 312, 314 shown in FIG. 5. As shown in FIG. 9, the emitter assembly 400 may comprise, for example, sixteen emitters 410 and eight detectors 412, 414, although other variations are possible. In some examples, the array 411 may include more or less emitters 410 than shown in FIG. 9. While two types of the detectors 412, 414 are shown in FIG. 9, the emitter assembly 400 may include more or less detectors depending on the emitters 410. In addition, different configurations may of the detectors 412, 414 may be used.

The emitters 410 and the detectors 412, 414 may be mounted on a substrate 416 (e.g., a board) and may be encapsulated by an optical element, such as a dome 418. For example, the substrate 416 may be a ceramic substrate formed from an aluminum nitride or an aluminum oxide material or some other reflective material. In addition, the substrate 416 may comprise a printed circuit board (PCB), such as a rigid PCB (e.g., made from an FR4 material) and/or a metal core PCB. In some examples, the emitters 410 may be mounted directly to the PCB (e.g., when the substrate 416 is omitted). The array 411 of the emitters 410 may be located within an area $A_{ARRAY}$, which may be shaped as, for example, a square (e.g., square shaped). For example, the array 411 of the emitters 410 (e.g., the area $A_{ARRAY}$) may have sides having respective lengths that are each equal to a distance $d_{ARRAY}$ (e.g., approximately 6.2 millimeters). The dome 418 may have an outer periphery 415 that surrounds the emitters 411 and the detectors 412, 414 (e.g., as shown in FIG. 9). The emitter assembly 400 may define a central axis 402 about which the area $A_{ARRAY}$ of the array 411 of the emitters 410 and the dome 418 may be centered.

The emitter assembly 400 may include multiple "chains" of the emitters 410 (e.g., series-coupled emitters). The emitters 410 of each chain may be coupled in series and may conduct the same drive current. Each chain may include emitters 410 that produce illumination at the same peak emission wavelength (e.g., emit light of the same color). The emitters 410 of different chains may emit light of different colors. For example, the emitter assembly 400 may comprise four differently-colored chains of emitters 410 (e.g., red, green, blue, and white or yellow). The array 411 of the emitters 410 may include a chain of four red emitters, a chain of four green emitters, a chain of four blue emitters, and a chain of four white or yellow emitters. The individual emitters 410 in each chain may be scattered about the array, and arranged so that no color appears twice in any row, column, or diagonal, to improve color mixing within the emitter assembly 400. Other variations of numbers of the emitters 410 per chain, the colors of the emitters 410, the numbers of the colors of the emitters 410, the number of chains of the emitters 410, etc., may be used. In addition, patterns other than a square array may be used.

The detectors 412, 414 may be located in pairs close to each edge of the array 411 of the emitters 410 and/or in the middle of the array 411 of emitters 410 as shown in FIG. 9. Similar to the emitters 410, the detectors 412, 414 may be LEDs that can be used to emit or receive optical or electrical signals. When the detectors 412, 414 are coupled to receive optical signals and emit electrical signals, the detectors may produce currents indicative of incident light from, for example, an emitter, a plurality of emitters, or a chain of emitters. The detectors 412, 414 may be any devices that produce currents indicative of incident light, such as a silicon photodiode or an LED. For example, the detectors 412, 414 may each be an LED having a peak emission wavelength in the range of approximately 550 nm to 700 nm, such that the detectors may not produce photocurrent in response to infrared light (e.g., to reduce interference from ambient light). For example, the first detector 412 of each pair of detectors may comprise a small red, orange or yellow LED, which may be used to measure a luminous flux of the light emitted by the red LEDs of the emitters 310. The second detector 414 may comprise a green LED, which may be used to measure a respective luminous flux of the light emitted by each of the green and blue LEDs of the emitters 410. Both of the first and second detectors 412, 414 may be used to measure the luminous flux of the white LED of the emitters 410 at different wavelengths (e.g., to characterize the spectrum of the light emitted by the white LED). The first detectors 412 may be coupled in parallel in the emitter assembly 400. Similarly, the second detectors 414 may be coupled in parallel in the emitter assembly 400. Other variations as described above may be used.

The dome 418 may comprise, for example, an optically-transmissive material (e.g., a translucent and/or transparent material), such as silicon or the like, and may be formed through an over-molding process, for example. The dome 418 may be a solid structure comprising the optically-transmissive material filled in between the substrate 416 and an outer surface 419 of the dome 418. The outer surface 419 of the dome 418 may be textured (e.g., lightly textured), for example, to increase light scattering and promote color mixing, as well as to reflect a portion (e.g., a small amount) of the light emitted by the emitters 410 back toward the detectors 412, 414 mounted on the substrate 416, e.g., about 5% (e.g., when the detectors 412, 414 are included). The emitters 410, the detectors 412, 414, the substrate 416, and the dome 418 may form an optical system. The array 411 of the emitters 410 may be located as close as possible together to the central axis 402 of the emitter assembly 400, so as to approximate a centrally-located point source. Other variations as described above may be used.

The dome 418 may define a profile that may be configured to reduce the apparent size of the array 411 of the emitters 410 (e.g., as shown in FIG. 10). The dome 418 may be characterized by a diameter $D_{DOME2}$ (e.g., approximately 14 millimeters) in a plane of the emitters 410. The dome 418 may be characterized by a height $H_{DOME2}$ (e.g., approximately 4 millimeters) at the central axis 402. The dome 418 may define a first portion 420 (e.g., a first circular portion) that may be located at a center of the dome 418 (e.g., centered about the central axis 402 of the emitter assembly 400). For example, the first portion 420 may have a circular periphery defined by a first boundary 422 (e.g., having a diameter $D_1$ of approximately 4-5 millimeters). The first portion 420 (e.g., a profile of the first portion 420) may define a dome shape (e.g., as shown in FIG. 10). The profile of the first portion 420 (e.g., the dome shape) may be configured to increase the amount of light emitted from the emitters 410 that is transmitted from the dome 418 within the first portion 420 (e.g., as compared to a flatter or more planar shape than the dome shape).

The dome 418 may define a second portion 430 (e.g., a second circular portion) that may be located around the first portion 420 and extends toward the substrate 416 (e.g., as shown in FIG. 9). For example, the second portion 430 may have a circular inner periphery defined by the first boundary 422 and a circular outer periphery defined by a second boundary 432 (e.g., having a diameter $D_2$ of approximately 10-11 millimeters). The second portion 430 may extend between the first boundary 422 and the second boundary 432 (e.g., for a distance $d_2$ of approximately 5-7 millimeters) to form a band surrounding the first portion 420. The second portion 430 (e.g., a profile of the second portion 430) may define a flat shape (e.g., a substantially-flat shape and/or a linear shape) between the first boundary 422 and the second boundary 432 as shown in FIG. 10. The profile of the second portion 430 may be configured to spread out the light emitted from the emitters 410 that is transmitted from the dome 418 within the second portion 420 (e.g., direct the light transmitted from the dome 418 farther away from the central axis 402 than a hemispherical dome, such as the dome 318, directs the light), so as to reduce the apparent size of the emitter assembly 400 (e.g., to be less than the distance $d_{APPARENT1}$ of the emitter assembly 300). In some examples, the second portion 430 (e.g., a profile of the second portion 423) may define a slightly concave shape (e.g., a curved profile that is sunk in towards the substrate 416), for example, to further direct light away from the central axis 402.

The dome 418 may define a third portion 440 that may be located around the second portion 430 (e.g., as shown in FIG. 9). For example, the third portion 440 may have a circular inner periphery defined by the second boundary 432 and a circular outer periphery that is aligned with the outer periphery 415 of the dome 418, such that the third portion 440 extends between the second boundary 432 and the outer periphery 415 of the dome 418. The third portion 440 (e.g., a profile of the third portion 443) may define a curved shape between the second boundary 432 and the outer periphery 415 of the dome 418 as shown in FIG. 10, for example, to allow the outer surface 419 of the dome 418 to terminate at the substrate 416.

Figures 11, 12:
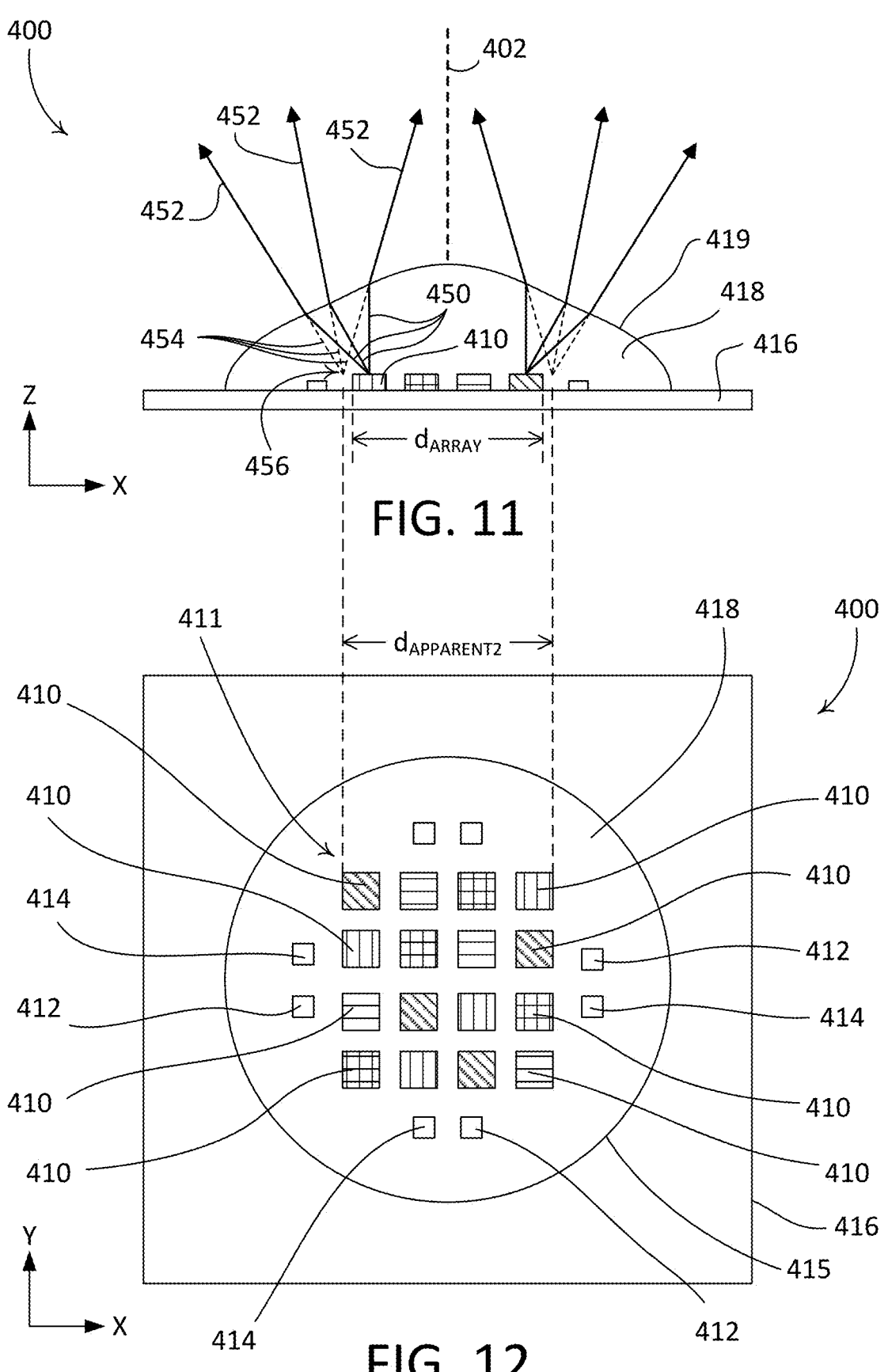
FIG. 11 is another side cross-section view of the emitter assembly of FIG. 9 illustrating some rays of light that may be emitted by one or more emitters of the emitter assembly.
FIG. 12 is a top view of the emitter assembly of FIG. 11 illustrating a magnified appearance of the emitters when a dome of the emitter assembly is shaped as a hemisphere.

FIG. 11 is another side cross-section view of the emitter assembly 400 illustrating some rays of light that may be emitted by one or more of the emitters 410 of the emitter assembly 400. For example, the left-most emitter 410 shown in FIG. 11 may emit light which may be conducted through the dome 418 as interior rays 450. At the outer surface 419 of the dome 418, the light of the interior rays 450 may be refracted, such that external rays 452 may propagate through the air external to the dome. For example, the light of the interior rays 450 may be refracted at the outer surface 419 of the dome 418 such that the external rays 452 are "bent" towards the central axis 402 of the emitter assembly 400.

When the dome 418 includes the first portion 420 that is dome shaped and the second portion 430 that is substantially flat and/or slightly convex, the dome 418 may be configured to magnify the emitters 410 less than when the emitter assembly 400 includes an optical element, such as a dome having a hemispherical shape. FIG. 12 is a top view of the emitter assembly 400 illustrating a magnified appearance of the emitters 410 of the array 411 of the emitters 410 and of the detectors 412, 414 when the dome 418 includes the first portion 420 and the second portion 430. For example, the magnified appearance of the array 411 of the emitters 410 may have sides with respective apparent lengths that are each equal to a distance $d_{APPARENT2}$ (e.g., less than or equal to approximately 7 millimeters). The apparent size of the array 411 of the emitters 410 may be less than or equal to, for example, approximately 110% of the actual size of the array 411 of the emitters 410. Stated differently, the distance $d_{APPARENT2}$ (e.g., the apparent distance) of the apparent lengths of the sides of the magnified appearance of the array 411 may be less than or equal to the distance $d_{ARRAY}$ (e.g., the actual distance) of the actual lengths of the sides of the array 411 of the emitters 410. FIG. 12 also shows apparent rays 454 that may illustrate the magnification of the array 411 of the emitters 410 when the dome 418 includes the first portion 420 and the second portion 430. For example, the apparent rays 454 may extend in the same direction as the external rays 450 internal to the dome 418. The apparent rays 454 may meet at a point 426 that may define an end of one of the sides of the magnified appearance of the array 411 of the emitters 410 (e.g., one end of the distance $d_{APPARENT2}$).

Figure 13:
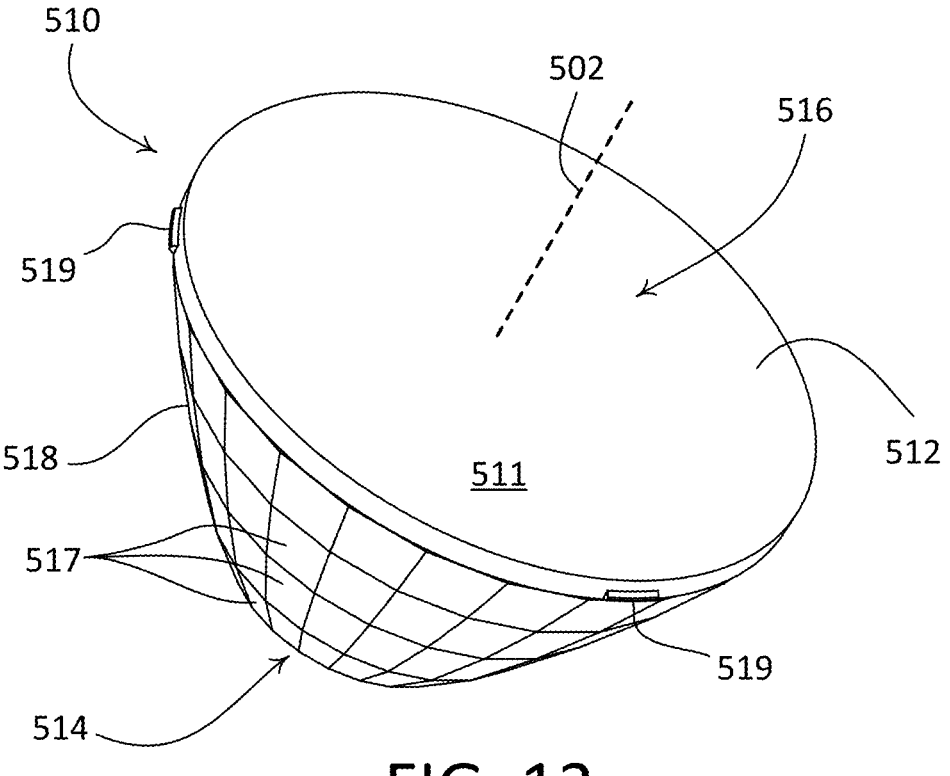
FIG. 13 is a perspective view of an example optical structure (e.g., a lens) that may be deployed as an optical structure of the lighting device assembly shown in FIG. 2.
Figure 14:
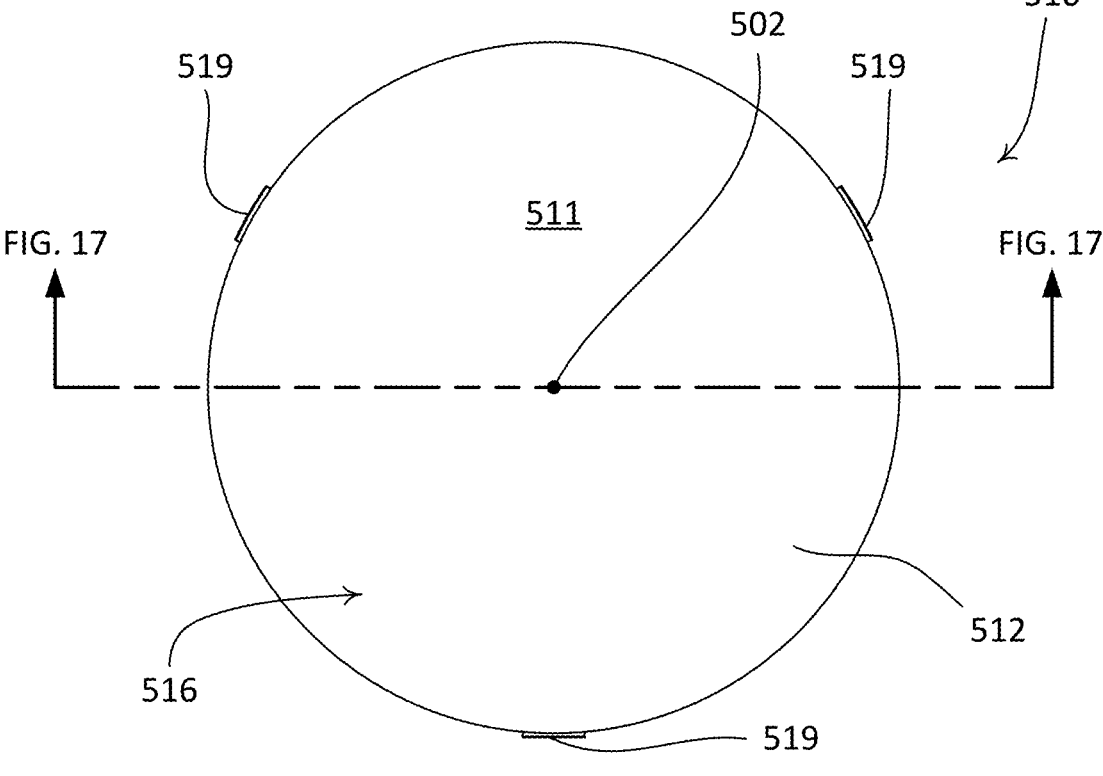
FIG. 14 is a top view of the optical structure of FIG. 13.
Figure 15:
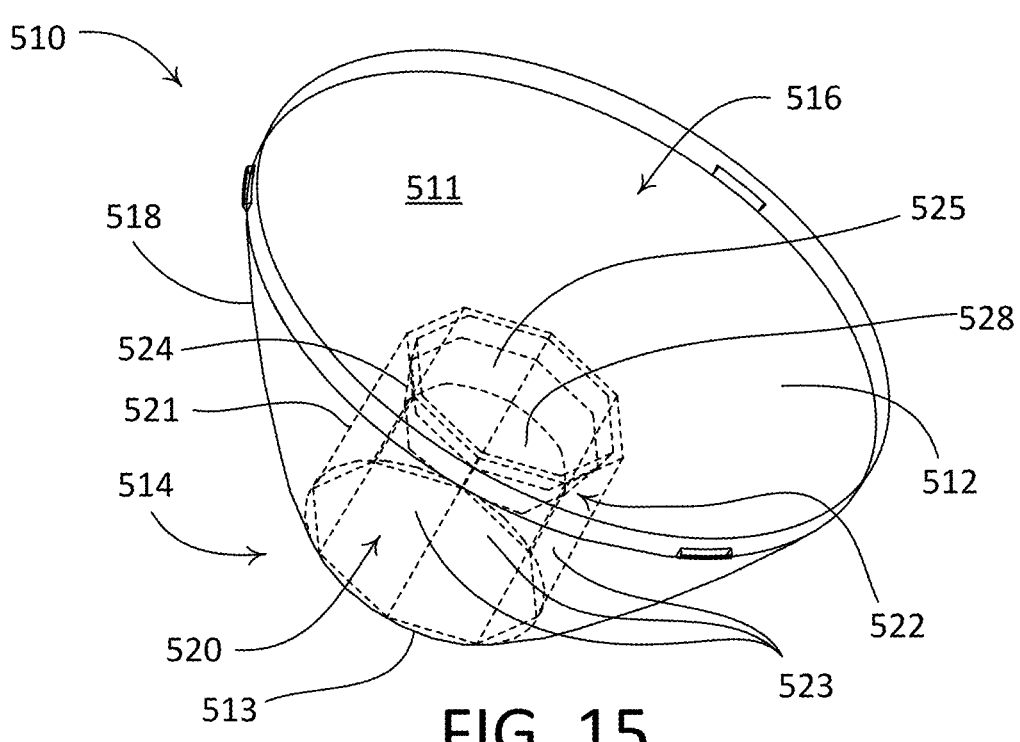
FIG. 15 is a perspective view of the optical structure of FIG. 13 with portions of the drawings in dashed lines to illustrate an internal portion of the optical structure.
Figure 16:
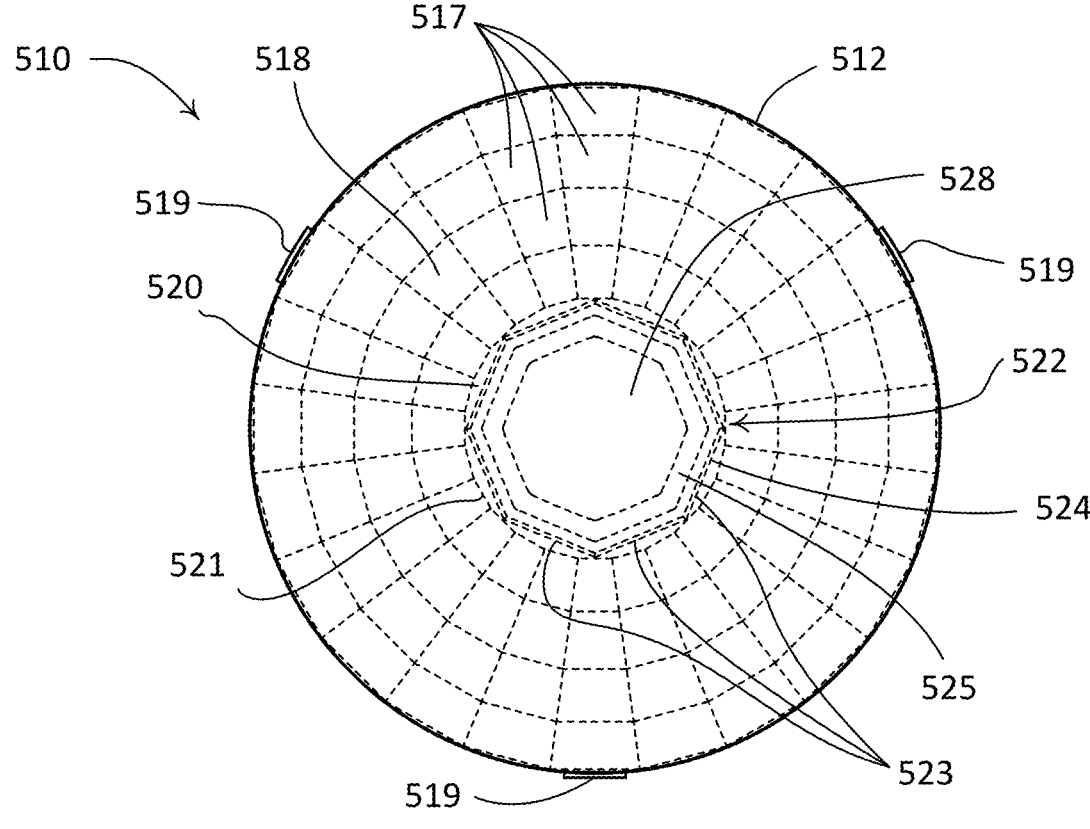
FIG. 16 is a top view of the optical structure of FIG. 13 with portions of the drawings in dashed lines to illustrate an internal portion of the optical structure.
Figure 17:
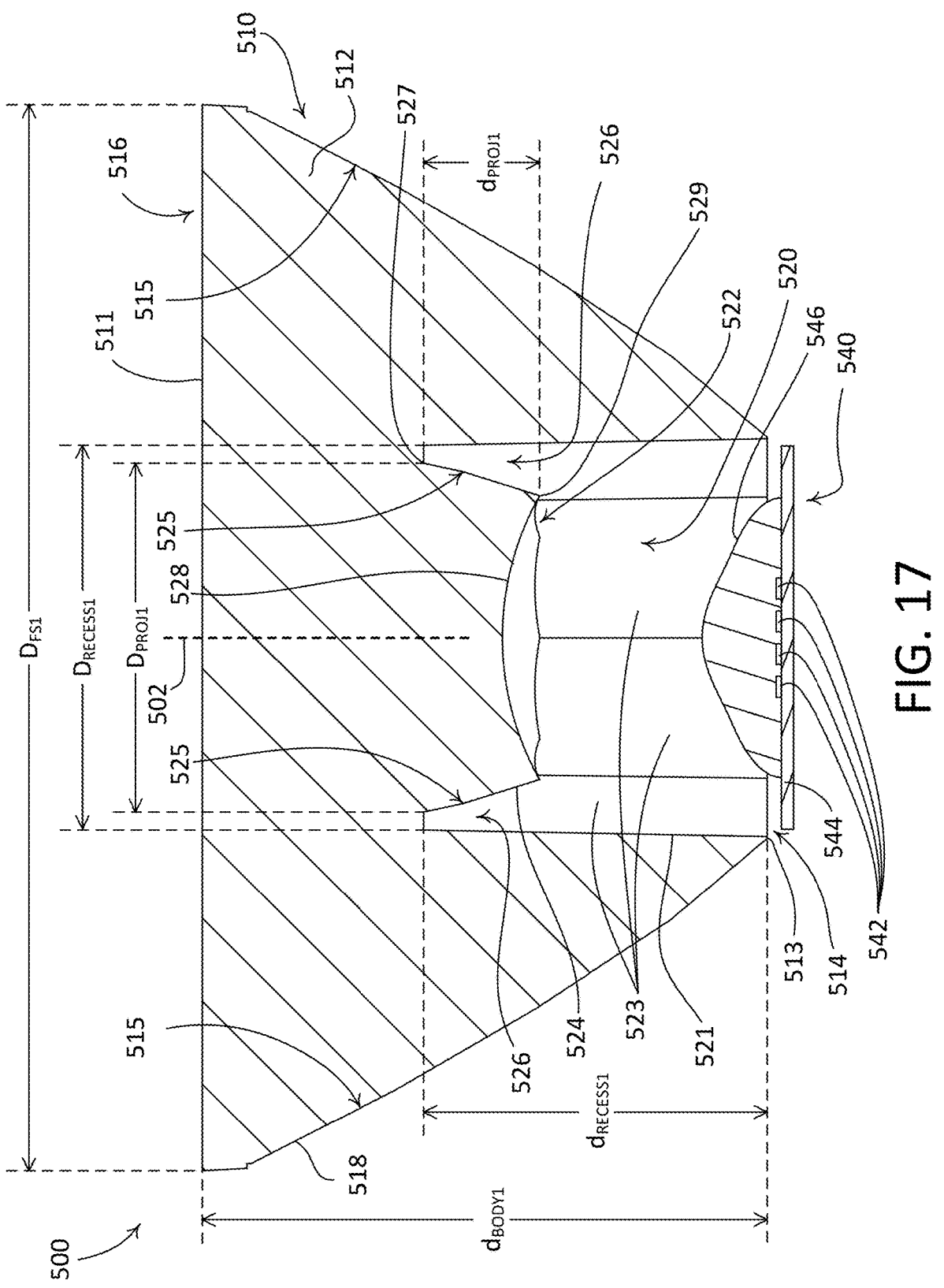
FIG. 17 is a side cross-section view of an optical system that includes the optical structure of FIG. 13 and an emitter assembly taken through the center of the optical structure and the emitter assembly.
Figure 18:
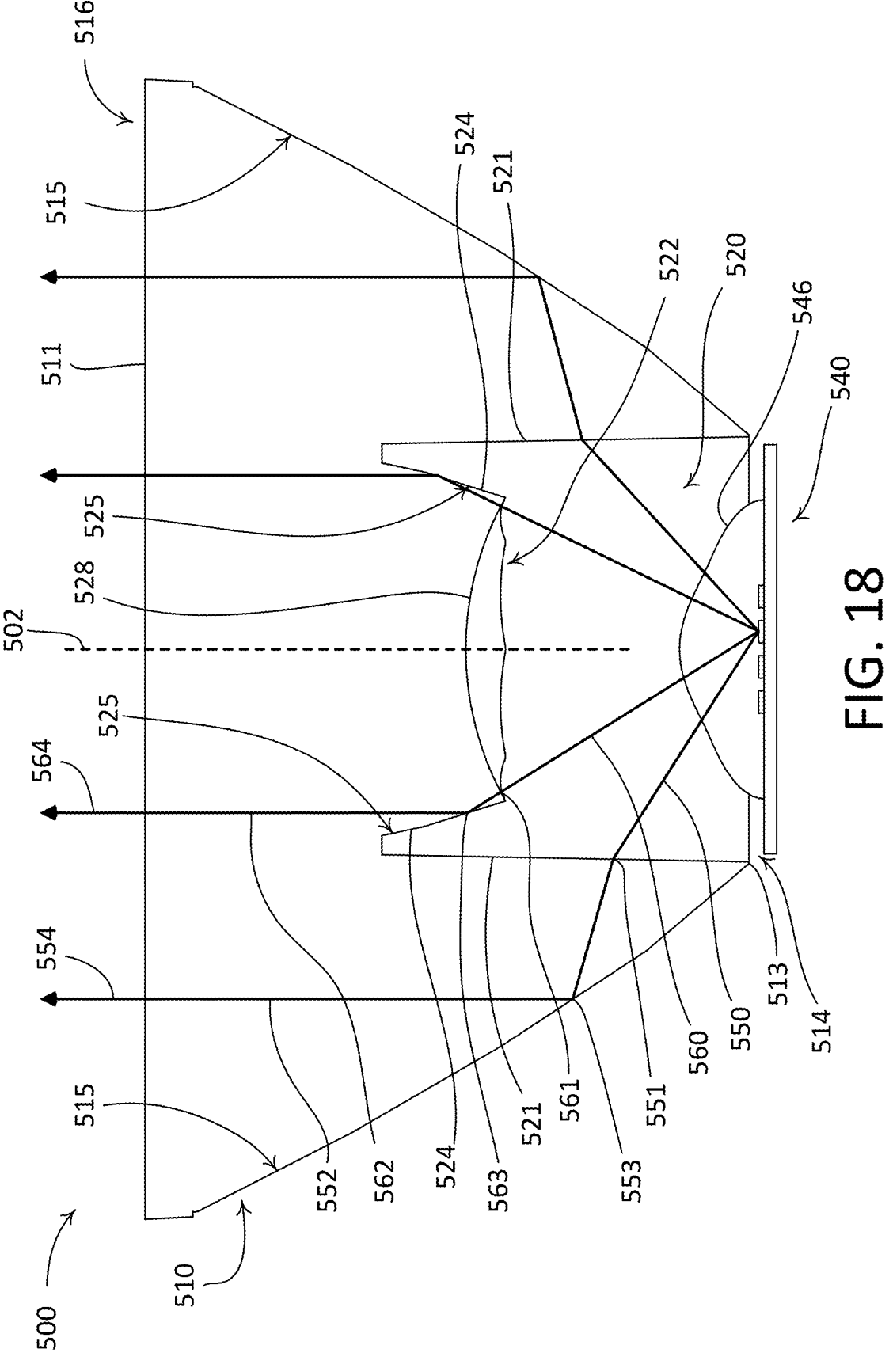
FIG. 18 is a side cross-section view of the optical system of FIG. 17 taken through the center of the optical structure and the emitter assembly and illustrating some rays of light that may be emitted by the emitter assembly.

FIG. 13 is a perspective view and FIG. 14 is a top view of an example optical structure 510 (e.g., a lens) that may be deployed as the optical structure 210 of the lighting device assembly 200 shown in FIGS. 2-4. FIG. 15 is a perspective view and FIG. 16 is a top view of the optical structure 510 with portions of the drawings in dashed lines to illustrate an internal portion of the optical structure 510 (e.g., as will be described in greater detail below). FIG. 17 is a side cross-section view of an optical system 500 that includes the optical structure 510 and an emitter assembly 540 taken through the center of the optical structure 510 and the emitter assembly 540 (e.g., through the line shown in FIG. 14). FIG. 18 is a side cross-section view of the optical system 500 taken through the center of the optical structure 510 and the emitter assembly 540 (e.g., through the line shown in FIG. 14) and illustrating some rays of light that may be emitted by the emitter assembly 540. The emitter assembly 540 may be identical to the emitter assembly 300 and/or the emitter assembly 400 (e.g., as shown in FIG. 17). The emitter assembly 540 may comprise one or more emitters 542 (e.g., the emitters 310, 410) and detectors (e.g., the detectors 312, 314 and/or the detectors 412, 414) (not shown) mounted on a substrate 544 and encapsulated by an optical element, such as a dome 546 (e.g., the dome 318 or the dome 418). The optical system 500 may be characterized by a central axis 502 about which the optical structure 510 and the emitter assembly 540 may be centered (e.g., as shown in FIG. 17).

The optical structure 510 may comprise a body 512 having a light-entry portion 514, a light-exit portion 516, and a side wall 518. For example, the body 512 may extend for a distance $d_{BODY1}$ of approximately 1.1 inches along the central axis 502. The light-exit portion 516 may comprise, for example, a front surface 511 that may be substantially flat (e.g., planar) and may have a circular periphery or a substantially circular periphery. For example, the front surface 511 may have a diameter $D_{FS1}$ of approximately 2 inches. The side wall 518 may define, for example, a first total internal reflection (TIR) surface 515 within the body 512 of the optical structure 510 (e.g., an outer or primary TIR surface of the optical structure 500). For example, the side wall 518 and/or the first TIR surface 515 may be smooth and may have a curved profile. Additionally or alternatively, the side wall 518 and/or the first TIR surface 515 may be faceted and may comprise a piece-wise curved profile as shown in FIGS. 13 and 16. For example, the side wall 518 may comprise a plurality of facets 517, each of which may be substantially flat (e.g., planar). The facets 517 may be positioned and connected together to form the piece-wise curved profile of the first TIR surface 515. The facets 517 may operate to improve color mixing of the different colors of the emitters 542 of the emitter assembly 540 in the cumulative light emitted by the optical system 500. The optical structure 510 may comprise tabs 519 configured to be received in corresponding recesses in a reflector (e.g., the recesses 229 in the reflector 220) for holding the optical structure 510 within a cavity (e.g., the cavity 225) of the reflector.

The light-entry portion 514 of the optical structure 510 may define a recess 520 (e.g., a cylindrical recess) that may be formed (e.g., cut) into a bottom surface 513 of the body 512. For example, the recess 520 may extend for a distance d$_{RECESS1}$ (e.g., approximately 0.7 inch) from the bottom surface 513 into the body 512 of the optical structure 510. The recess 520 may be surrounded by an interior wall 521 (e.g., a cylindrical wall), and may be characterized by a diameter D$_{RECESS1}$ (e.g., approximately 0.7 inches). In FIG. 15, the facets 517 of the side wall 518 and the first TIR surface 515 are omitted to better illustrate the recess 520 and the internal wall 521 of the light-entry portion 514. The emitter assembly 540 may be mounted to the substrate 544 below the light-entry portion 514 of the optical structure 510, and the dome 546 of the emitter assembly 540 may be configured to extend into the recess 520 (e.g., as shown in FIG. 17). The interior wall 521 of the recess 520 may be smooth and/or faceted. For example, as shown in FIG. 15, the interior wall 521 may comprise a plurality of facets 523 (e.g., 8 facets), each of which may be substantially flat (e.g., planar). The facets 523 may operate to improve color mixing of the different colors of the emitters 542 of the emitter assembly 540 in the cumulative light emitted by the optical system 500.

The light-entry portion 514 of the optical structure 510 may comprise a projection 522 that may extend from the body 512 into the recess 520 of the light-entry portion 514. For example, the projection 522 may extend for a distance d$_{PROJ1}$ (e.g., approximately 0.2 inches) into the recess 520. The projection 522 may comprise a side wall 524 that may define a second TIR surface 525 within the body 512 of the optical structure 500 (e.g., an inner or secondary TIR surface of the optical structure 500). The second TIR surface 525 may have a curved profile. The projection 522 may be characterized by a diameter D$_{PROJ1}$ that varies in value with respect to distance along a length of the projection 522 from an upper end 527 to a lower end 529 of the projection 522. For example, the diameter D$_{PROJ1}$ of the projection 522 may get smaller along the length of the projection 522 from the upper end 527 to the lower end 529 (e.g., from approximately 0.7 to 0.5 inches). The diameter D$_{PROJ1}$ of the projection 522 may be smaller than the diameter D$_{RECESS1}$ of the recess 520 at any point along the length of the projection 522, such that a gap 526 is formed between the side wall 524 of the projection 522 and the internal wall 521 of the recess 520. The projection 522 may also comprise a convex surface 528 located at the lower end 529 of the projection 522 within a periphery of the side wall 524 of the projection 522. The convex surface 528 may project upwards into the projection 522 from the lower end 529 towards the light-exit portion 516. For example, the second TIR surface 525 and/or the convex surface 528 of the projection 522 may be centered about the central axis 502.

The optical structure 510 may conduct rays of light that are transmitted by the emitter assembly 540 of the optical system 500 as shown in FIG. 18. In FIG. 18, the cross-hatching lines of the body 512 of the optical structure 510 and the facets 523 of the interior wall 521 are omitted to better illustrate the ray of light that are conducted through the optical structure 510. For example, the emitter assembly 540 may emit a first emitted ray 550, which may be from the dome 546 of the emitter assembly 540 through the air of the recess 520 towards the light-entry portion 514 of the optical structure 510. At the interior wall 521 of the recess 520, the light of the first emitted ray 550 may be refracted at point 551, such that a first internal ray 552 may be conducted through the body 512 of the optical structure 510. The first internal ray 552 may be reflected (e.g., totally reflected) off of the first TIR surface 515 at point 553. For example, the first TIR surface 515 may be sized and/or shaped and the first internal ray 522 may contact the first TIR surface 515 at an appropriate angle (e.g., greater than or equal to a critical angle) such that all of the first internal ray 552 is reflected off of the first TIR surface 515 towards the light-exit portion 516 of the optical structure 510. At the front surface 511 of the light-exit portion 516, the first internal ray 552 may be approximately perpendicular to the front surface 511 of the light-exit portion 516 such that approximately all of the light from the first internal ray 552 is transmitted from (e.g., refracted at) the light-exit portion 516 through the air as a first external ray 554. While only the first internal ray 522 is shown being reflected off of the TIR surface 515 in FIG. 18, the emitter assembly 540 may transmit multiple emitted rays resulting in multiple internal rays that are reflected off of the first TIR surface 515 towards the light-exit portion 516. The multiple internal rays may be reflected off of the first TIR surface 515 such that the multiple internal rays are substantially collimated as respective external rays that exit the light-exit portion 516 of the optical structure 510 (e.g., such that the external rays are substantially perpendicular to the front surface 511 of the light-exit portion 516 and substantially parallel to each other).

In addition, the emitter assembly 540 may emit a second emitted ray 560, which may be transmitted from the dome 546 of the emitter assembly 540 through the air of the recess 522 towards the light-entry portion 514 of the optical structure 510. At the dome 528 of the projection 522, the light of the second emitted ray 560 may be refracted at point 561, such that a second internal ray 562 may be conducted through the body 512 of the optical structure 510. The second internal ray 562 may the be reflected (e.g., totally reflected) off of the second TIR surface 525 at point 563. For example, the second TIR surface 525 may be sized and/or shaped and the second internal ray 562 may contact the second TIR surface 525 at an appropriate angle (e.g., greater than or equal to a critical angle) such that all of the second internal ray 562 is reflected off of the second TIR surface 525 towards the light-exit portion 516 of the optical structure 510. At the front surface 511 of the light-exit portion 516, the second internal ray 562 may be approximately perpendicular to the front surface 511 of the light-exit portion 516 such that approximately all of the light from the second internal ray 522 is transmitted from the light-exit portion 516 through the air as a second external ray 564. While only the second internal ray 562 is shown being reflected off of the second TIR surface 525 in FIG. 18, the emitter assembly 540 may transmit multiple emitted rays resulting in multiple internal rays that are reflected off of the second TIR surface 525 towards the light-exit portion 516. The multiple internal rays may be reflected off of the second TIR surface 525 such that the multiple internal rays are substantially collimated as respective external rays that exit the light-exit portion 516 of the optical structure 510. The second TIR surface 525 and the convex surface 528 of the projection 522 may be configured to focus the light emitted by the emitter assembly 540 towards the central axis 502 of the optical system 500, for example, to provide a narrow beam angle (e.g., approximately 25°) for the optical system 500.

Figure 19:
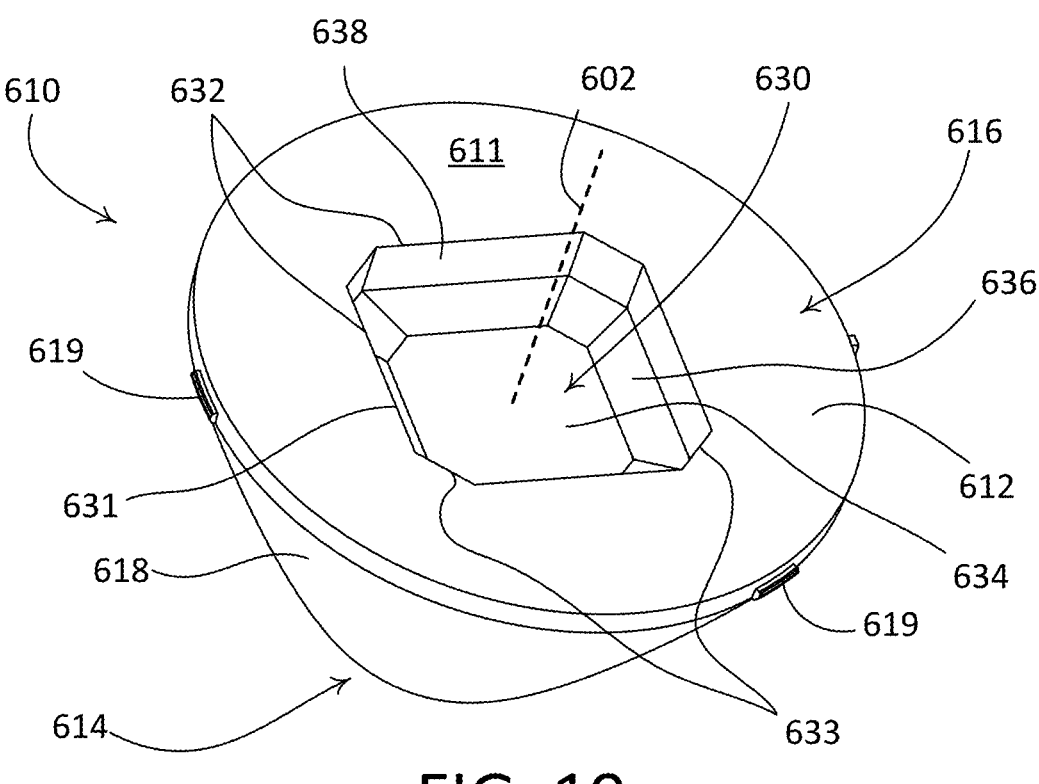
FIG. 19 is a perspective view of another example optical structure (e.g., a lens) that may be deployed as an optical structure of the lighting device assembly shown in FIG. 2.
Figure 20:
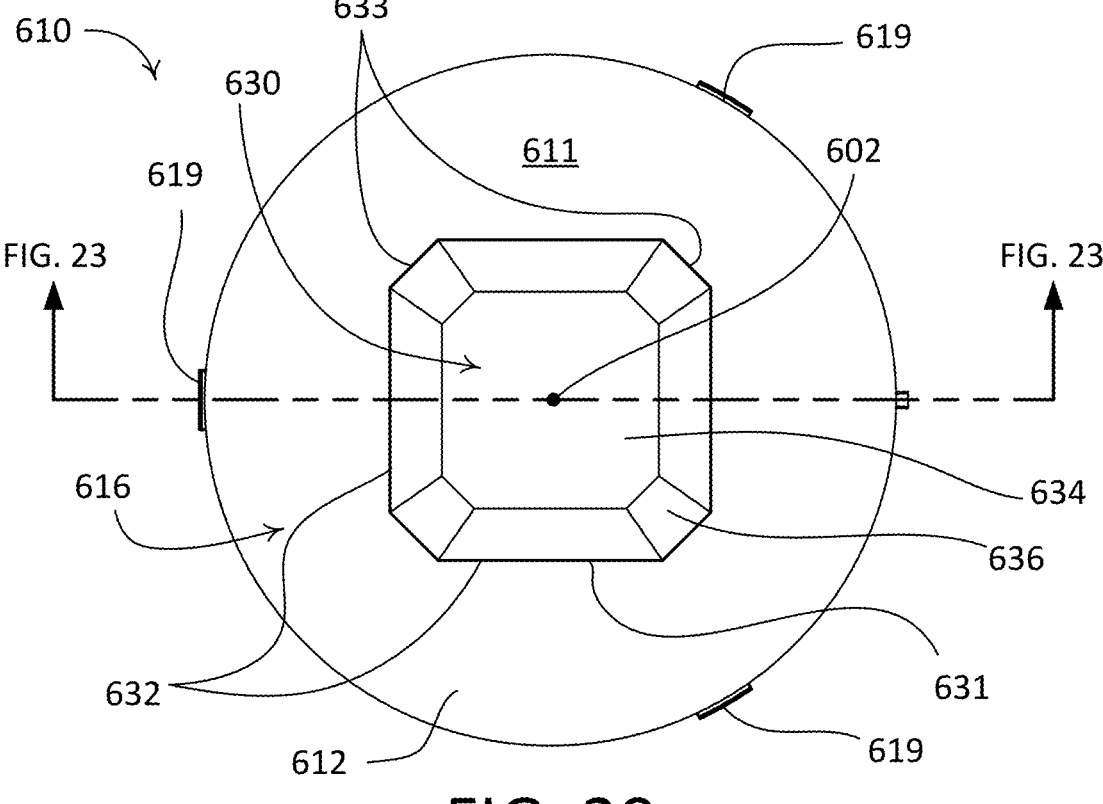
FIG. 20 is a top view of the optical structure of FIG. 19.
Figure 21:
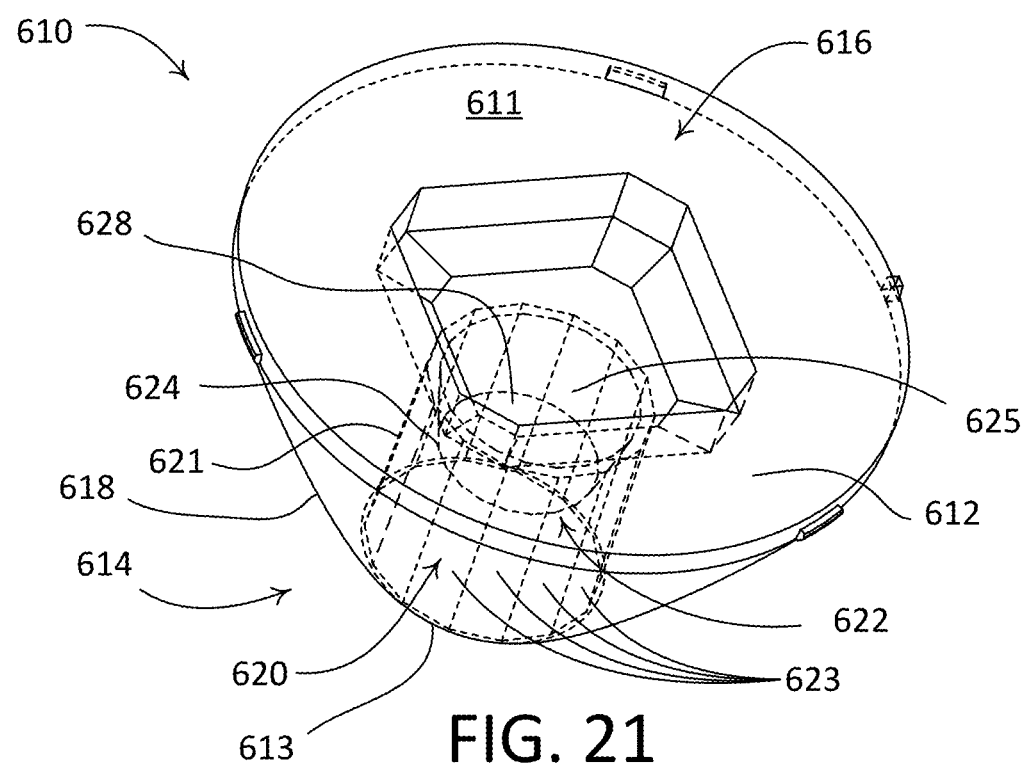
FIG. 21 is a perspective view of the optical structure of FIG. 19 with portions of the drawings in dashed lines to illustrate an internal portion of the optical structure.
Figure 22:
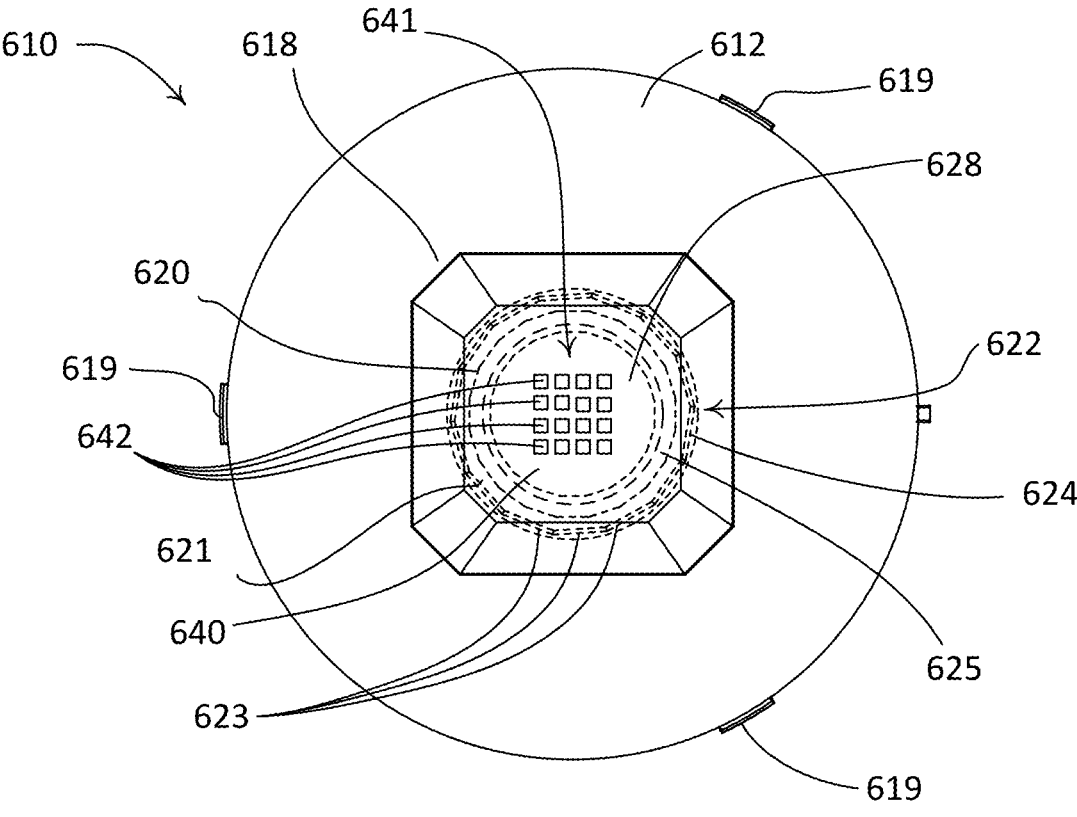
FIG. 22 is a top view of the optical structure of FIG. 19 with portions of the drawings in dashed lines to illustrate an internal portion of the optical structure.
Figure 23:
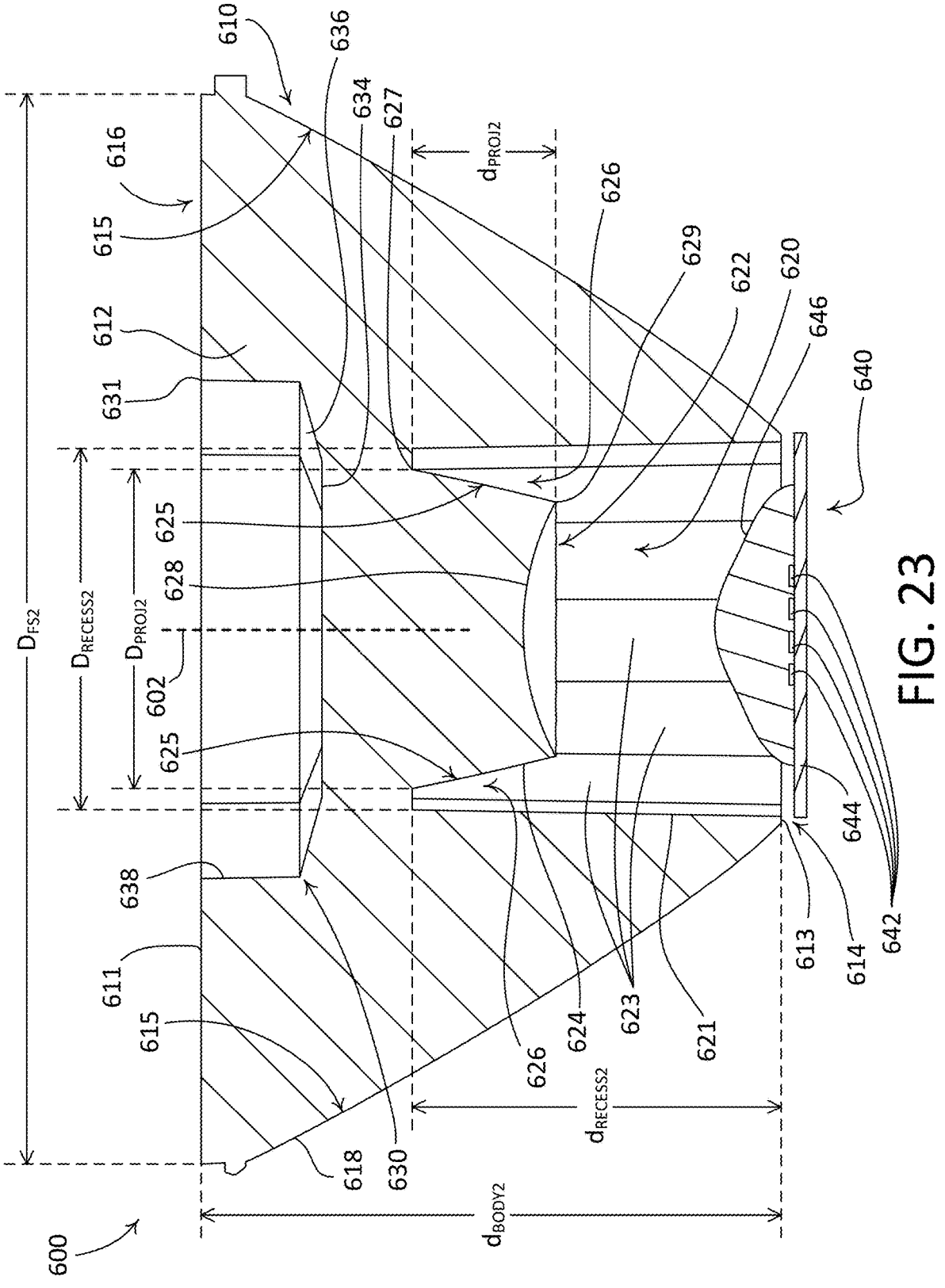
FIG. 23 is a side cross-section view of an optical system that includes the optical structure of FIG. 19 and an emitter assembly taken through the center of the optical structure and the emitter assembly.
Figure 24:
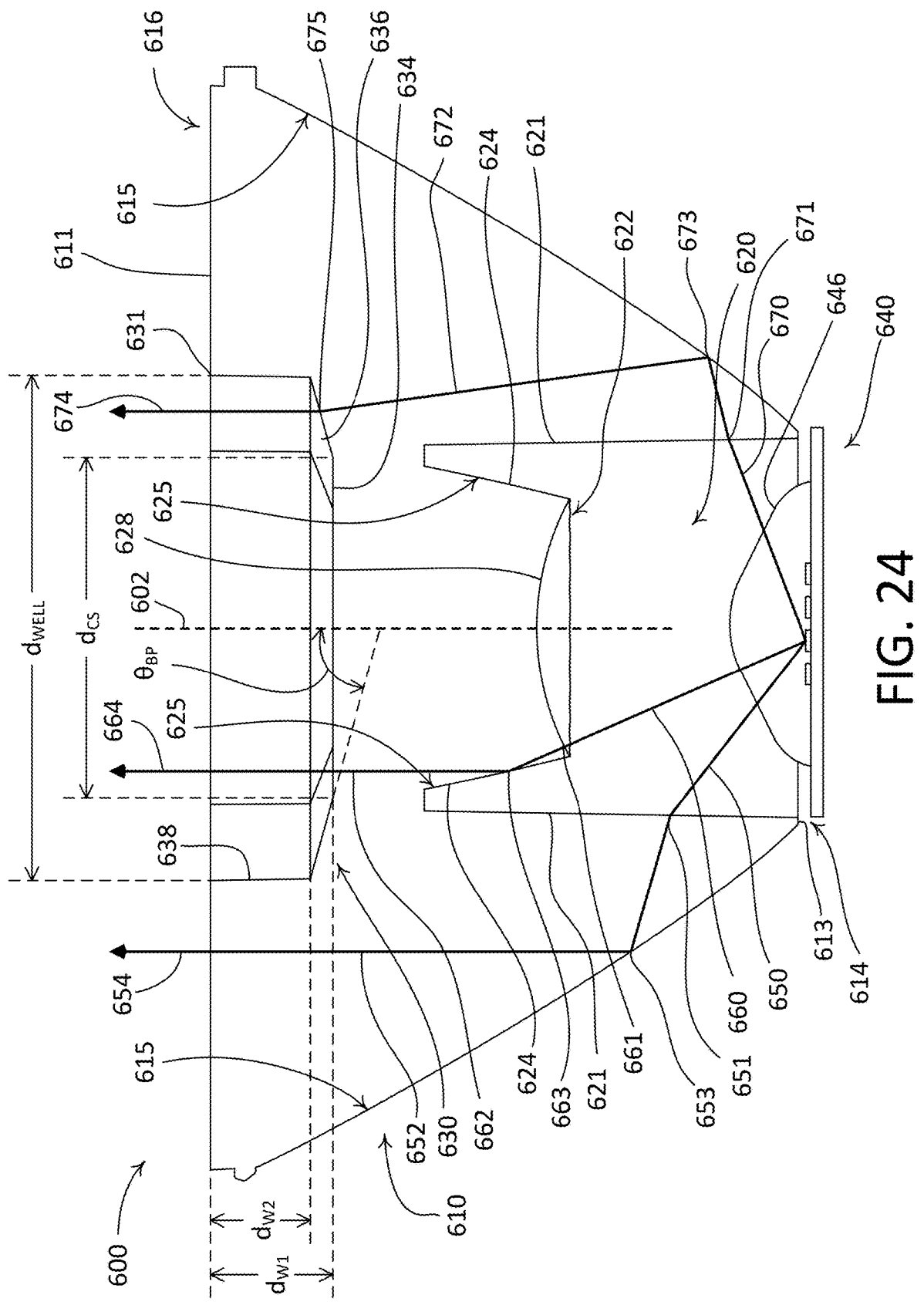
FIG. 24 is a side cross-section view of the optical system of FIG. 23 taken through the center of the optical structure and the emitter assembly and illustrating some rays of light that may be emitted by the emitter assembly.

FIG. 19 is a perspective view and FIG. 20 is a top view of another example optical structure 610 (e.g., a lens) that may be deployed as the optical structure 210 of the lighting device assembly 200 shown in FIGS. 2-4. FIG. 21 is a perspective view and FIG. 22 is a top view of the optical structure 610 with portions of the drawings in dashed lines to illustrate an internal portion of the optical structure 610 (e.g., as will be described in greater detail below). FIG. 23 is a side cross-section view of an optical system 600 that includes the optical structure 610 and an emitter assembly 640 taken through the center of the optical structure 610 and the emitter assembly 640 (e.g., through the line shown in FIG. 20). FIG. 24 is a side cross-section view of the optical system 600 taken through the center of the optical structure 610 and the emitter assembly 640 (e.g., through the line shown in FIG. 20) and illustrating some rays of light that may be emitted by the emitter assembly 640. The emitter assembly 640 is also shown in FIG. 22. The emitter assembly 640 may be identical to the emitter assembly 300 and/or the emitter assembly 400 (e.g., as shown in FIG. 23). The emitter assembly 640 may comprise an array 641 of emitters 642 (e.g., emitters 310, 410) and detectors (e.g., the detectors 312, 314 and/or the detectors 412, 414) (not shown) mounted on a substrate 644 and encapsulated by an optical element, such as a dome 646 (e.g., the dome 318 or the dome 418). The optical system 600 may be characterized by a central axis 602 about which the optical structure 610 and the emitter assembly 640 may be centered (e.g., as shown in FIG. 23).

The optical structure 610 may comprise a body 612 having a light-entry portion 614, a light-exit portion 616, and a side wall 618. For example, the body 612 may extend for a distance $d_{BODY2}$ of approximately 1.1 inches along the central axis 602. The light-exit portion 616 may comprise, for example, a front surface 611 that may be substantially flat (e.g., planar) and may have a circular periphery or a substantially circular periphery. For example, the front surface 611 may have a diameter $D_{FS2}$ of approximately 2 inches. The side wall 618 may define, for example, a first total internal reflection (TIR) surface 615 within the body 612 of the optical structure 610 (e.g., an outer or primary TIR surface of the optical structure 600). For example, the side wall 618 and/or the first TIR surface 615 may be smooth and may have a curved profile as shown in FIGS. 19, 20, and 21. Additionally or alternatively, the side wall 618 and/or the first TIR surface 615 may be faceted and may comprise a piece-wise curved profile (e.g., as similarly described above for the facets 517). The optical structure 610 may comprise tabs 619 configured to be received in corresponding recesses in a reflector (e.g., the recesses 229 in the reflector 220) for holding the optical structure 610 within a cavity (e.g., the cavity 225) of the reflector.

The light-entry portion 614 of the optical structure 610 may define a recess 620 (e.g., a cylindrical recess) that may be formed (e.g., cut) into a bottom surface 613 of the body 612. For example, the recess 620 may extend for a distance $d_{RECESS2}$ (e.g., approximately 0.7 inches) from the bottom surface 613 into the body 612 of the optical structure 610. The recess 620 may be surrounded by an interior wall 621 (e.g., a cylindrical wall), and may be characterized by a diameter $D_{RECESS2}$ (e.g., approximately 0.7 inches). The emitter assembly 640 may be mounted to the substrate 644 below the light-entry portion 614 of the optical structure 610 and the dome 646 of the emitter assembly 640 may be configured to extend into the recess 620 (e.g., as shown in FIG. 23). The interior wall 621 of the recess 620 may be smooth and/or faceted. For example, as shown in FIG. 21, the interior wall 621 may comprise a plurality of facets 623 (e.g., 14 facets), each of which may be substantially flat (e.g., planar). The facets 623 may operate to improve color mixing of the different colors of the emitters 642 of the emitter assembly 640 in the cumulative light emitted by the optical system 600.

The light-entry portion 614 of the optical structure 610 may comprise a projection 622 that may extend from the body 612 into the recess 620 of the light-entry portion 614. For example, the projection 622 may extend for a distance $d_{PROJ2}$ (e.g., approximately 0.3 inches) into the recess 620. The projection 622 may comprise a side wall 624 that may define a second TIR surface 625 within the body 612 of the optical structure 600 (e.g., an inner or secondary TIR surface of the optical structure 500). The second TIR surface 625 may have a curved profile. The projection 622 may be characterized by a diameter $D_{PROJ2}$ that that varies in value with respect to distance along a length of the projection 622 from an upper end 627 to a lower end 629 of the projection 622. For example, the diameter $D_{PROJ1}$ of the projection 622 may get smaller along the length of the projection 622 from the upper end 627 to the lower end 629 (e.g., from approximately 0.6 to 0.5 inches). The diameter $D_{PROJ2}$ of the projection 622 may be smaller than the diameter $D_{RECESS2}$ of the recess 620 along the length of the projection 622, such that a gap 626 is formed between the side wall 624 and the projection 622 and the internal wall 621 of the recess 620. The projection 622 may also comprise a convex surface 628 located at a lower end 629 of the projection 622 within a periphery of the side wall 624 of the projection 622. The convex surface 628 may project upwards into the projection 622 from the lower end 629 towards the light-exit portion 616. For example, the second TIR surface 625 and/or the convex surface 628 of the projection 622 may be centered about the central axis 602.

When interior rays of light contact the first TIR surface 615 close to the bottom surface 613 of the body 612 (e.g., close to the recess 620), the interior rays may be reflected at an angle that is not perpendicular to the front surface 611 and the interior rays may be directed towards the central axis 602 of the optical system 600. To correct the path of interior rays that are reflected towards the central axis 602, the light-exit portion 616 of the optical structure 610 may comprise an octagon well 630 (e.g., an octagon-shaped well and/or an eight-sided well), which may operate to refract the interior ray, such that the light may exit the optical structure 610 substantially collimated with other exiting rays. The octagon well 630 may be formed in (e.g., cut into) the front surface 611 of the light-exit portion 616, such that the octagon well 630 defines an opening 631 in the front surface 611. The octagon well 630 (e.g., the opening 630 of the octagon well 630) may be centered about the central axis 602. For example, the octagon well 630 (e.g., the opening 630 of the octagon well 630) may have a length and a width that are both a distance $d_{WELL}$ (FIG. 24) of approximately 1.0 inches.

The octagon well 630 (e.g., the opening 630 of the octagon well 630) may comprise long sides 632 (e.g., four long sides) and short sides 633 (e.g., four short sides). The long sides 632 and the short sides 633 may alternate, such that each of the short sides 633 may be connected between two of the long sides 632. The long sides 632 may be straight and may be parallel to respective sides of the area $A_{ARRAY}$ of the array 641 of the emitters 642 of the emitter assembly 640 (e.g., as shown in FIG. 22). The short sides 633 may bisect (e.g., truncate) corners of a square that may be formed by the long sides 632. For example, the short sides 633 may be straight as shown in FIGS. 19 and 20. Each of the short sides

633 may be oriented at an angle of, for example, approximately 45° or −45° from the central axis 602. In some examples, each of the short sides 633 may be curved (e.g., having a center in the direction of the central axis 602). The short sides 633 may allow the octagon well 630 to have a circular-type shape (e.g., to better match the circular periphery of the front surface 611) than if the octagon well 630 only had the long sides 632 (e.g., than if the octagon well 630 was square shaped).

The octagon well 630 may comprise a center surface 634 that may be flat and parallel to the front surface 611. For example, the center surface 634 may have a length and a width that are both a distance des (FIG. 24) of approximately 0.7 inches. The center surface 634 may be offset from the front surface 611 by a distance $d_{W1}$ of approximately 0.25 inches. The center surface 634 may be surrounded by a beveled portion 636 having individual panes that may be oriented at an angle $\theta_{BP}$ (FIG. 24) of approximately 74° or −74° from the central axis 602. The octagon well 630 may comprise a side wall 638 extending between the front surface 611 and the beveled portion 636 (e.g., surrounding the beveled portion 636). For example, the side wall 638 of the octagon well 630 may be approximately perpendicular to the front surface 611 (e.g., vertical as show in FIG. 23), such that the side wall 638 is aligned with the long sides 632 and the short sides 633 of the octagon well 630 (e.g., of the opening 631 defined by the octagon well 630). The beveled portion 636 of the octagon well 630 may be offset from the front surface 611 by a distance $d_{W2}$ of approximately 0.20 inches. The beveled portion 636 may be configured to refract interior rays that are reflected off of the first TIR surface 615 towards the central axis 602. The beveled portion 636 may be configured to refract those interior rays, such that resulting exterior rays are substantially collimated with the other external rays transmitted from the light-exit portion 616 of the optical structure 610 (e.g., such that the external rays are substantially perpendicular to the front surface 611 of the light-exit portion 616 and substantially parallel to each other). The side wall 638 of the octagon well 630 may be sized to locate the beveled portion 636 at a location to refract the interior rays that are reflected off of the first TIR surface 615 in order to correct the path of interior rays, such that the exterior rays are substantially collimated with the other external rays transmitted from the light-exit portion 616 of the optical structure 610. In addition, the projection 622 and the second TIR surface 625 may be sized and located within the optical structure 610, such that interior rays that enter the body 612 through the dome 628 and/or are reflected off of the second TIR surface 625 are directed towards the center surface 634 of the octagon well 630 (e.g., and not directed towards the beveled portion 636 of the octagon well 630).

The optical structure 610 may conduct rays of light that are transmitted by the emitter assembly 640 of the optical system 600 as shown in FIG. 24. In FIG. 24, the cross-hatching lines of the body 612 of the optical structure 610 and the facets 623 of the interior wall 621 are omitted to better illustrate the ray of light that are conducted through the optical structure 610. For example, the emitter assembly 640 may emit a first emitted ray 650, which may be transmitted from the dome 646 of the emitter assembly 640 through the air of the recess 620 towards the light-entry portion 614 of the optical structure 610. At the interior wall 621 of the recess 620, the light of the first emitted ray 650 may be refracted at point 651, such that a first internal ray 652 may be conducted through the body 612 of the optical structure 610. The first internal ray 652 may be reflected (e.g., totally reflected) off of the first TIR surface 615 at point 653. For example, the first TIR surface 615 may be sized and/or shaped and the first internal ray 652 may contact the first TIR surface 615 at an appropriate angle (e.g., greater than or equal to a critical angle) such that all of the first internal ray 652 is reflected off of the first TIR surface 615 towards the light-exit portion 616 of the optical structure 610. At the front surface 611 of the light-exit portion 616, the first internal ray 652 may be approximately perpendicular to the front surface 611 of the light-exit portion 616 such that approximately all of the light from the first internal ray 652 is transmitted from (e.g., refracted at) the light-exit portion 616 through the air as a first external ray 654. While only the first internal ray 652 is shown being reflected off of the TIR surface 615 in FIG. 24, the emitter assembly 640 may transmit multiple emitted rays resulting in multiple internal rays that are reflected off of the first TIR surface 615 towards the light-exit portion 616. The multiple internal rays may be reflected off of the first TIR surface 615 such that the multiple internal rays are substantially collimated as respective external rays that exit the light-exit portion 616 of the optical structure 610.

In addition, the emitter assembly 640 may emit a second emitted ray 660, which may be transmitted from the dome 646 of the emitter assembly 640 through the air of the recess 620 towards the light-entry portion 614 of the optical structure 610. At the dome 628 of the projection 622, the light of the second emitted ray 660 may be refracted at point 661, such that a second internal ray 662 may be conducted through the body 612 of the optical structure 610. The second internal ray 662 may the be reflected (e.g., totally reflected) off of the second TIR surface 625 at point 663. For example, the second TIR surface 625 may be sized and/or shaped and the second internal ray 662 may contact the second TIR surface 625 at an appropriate angle (e.g., greater than or equal to a critical angle) such that all of the second internal ray 662 is reflected off of the second TIR surface 625 towards the center surface 634 of the octagon well 630. At the center surface 634 of the octagon well 630, the second internal ray 662 may be approximately perpendicular to the center surface 634 such that approximately all of the light from the second internal ray 662 is transmitted from the light-exit portion 616 through the air as a second external ray 664. While only the second internal ray 662 is shown being reflected off of the second TIR surface 625 in FIG. 18, the emitter assembly 640 may transmit multiple emitted rays resulting in multiple internal rays that are reflected off of the second TIR surface 625 towards the light-exit portion 616. The multiple internal rays may be reflected off of the second TIR surface 625 such that the multiple internal rays are substantially collimated as respective external rays that exit the light-exit portion 616 of the optical structure 610. The second TIR surface 625 and the convex surface 628 of the projection 622 may be configured to focus the light emitted by the emitter assembly 640 towards the central axis 602 of the optical system 600, for example, to provide a narrow beam angle for the optical system 600.

When interior rays of light contact the first TIR surface 615 close to the bottom surface 613 of the body 612, the interior ray may be reflected at an angle that is not perpendicular to the front surface 611 and is directed towards the central axis 602 of the optical system 600. For example, the emitter assembly 640 may emit a third emitted ray 670, which may be transmitted from the dome 646 of the emitter assembly 640 through the air of the recess 622 towards the light-entry portion 614 of the optical structure 610. At the interior wall 621 of the recess 620, the light of the third emitted ray 670 may be refracted at point 671, such that a third internal ray 672 may be conducted through the body 612 of the optical structure 610. The third internal ray 672 may be reflected (e.g., totally reflected) off of the first TIR surface 615 at point 673, but may be directed towards the central axis 602. At the beveled portion 636 of the octagon well 630, the third internal ray 672 may be refracted at point 675, such that a third external ray 674 is transmitted through the air from the light-exit portion 616 of the optical structure 610. While only the third internal ray 672 is shown being reflected off of the TIR surface 615 towards the beveled portion 636 of the octagon well 630 in FIG. 24, the emitter assembly 640 may transmit multiple emitted rays resulting in multiple internal rays that are reflected off of the first TIR surface 615 towards the beveled portion 636 of the octagon well 630. Those internal rays may be refracted off of the beveled portion 636 of the octagon well 630 such that resulting external rays are substantially collimated with other external rays that exit the light-exit portion 616 of the optical structure 610. The side wall 638 may allow the beveled portion 636 of the octagon well 630 to be positioned to appropriately refract the interior rays that are reflected off of the first TIR surface 615 close to the bottom surface 613 of the body 612 without interfering with interior rays (e.g., such as the interior ray 662) that are transmitted through the convex surface 628 of the projection 622 and/or reflected by the second TIR surface 625. With the octagon well 630 included in the light-exit portion 616 of the optical structure 610, more external rays that exit the light-exit portion 616 may be substantially collimated than when the octagon well 630 is not included (e.g., as with the optical structure 510), such that the optical system 600 may be characterized by a narrower beam angle (e.g., approximately 15°), which may be narrower than the beam angle of the optical system 500 shown in FIGS. 13-18.

Figure 25:
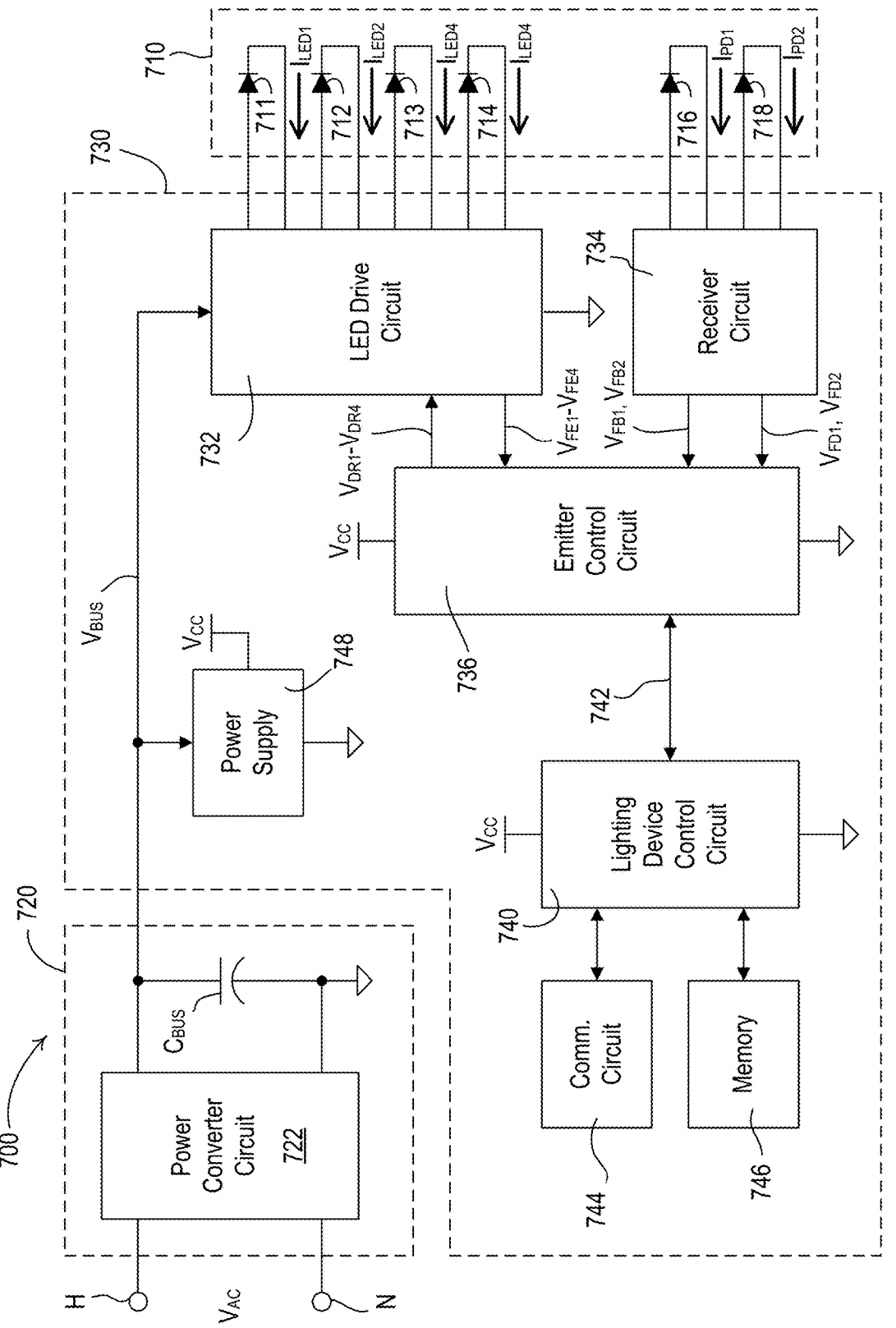
FIG. 25 is a simplified block diagram of an example lighting device, such as the lighting device shown in FIG. 1.

FIG. 25 is a simplified block diagram of an example lighting device 700, such as a controllable lighting device (e.g., the lighting device 100 shown in FIG. 1). The lighting device 700 may comprise one or more emitter assemblies 710 (e.g., the emitter assembly 240 shown in FIGS. 3 and 4, the emitter assembly 300 shown in FIGS. 5-8, and/or the emitter assembly 400 shown in FIGS. 9-12). For example, the lighting device 700 may comprise an emitter assembly 710 that may include one or more emitters 711, 712, 713, 714. Each of the emitters 711, 712, 713, 714 is shown in FIG. 25 as a single LED, but may each comprise a plurality of LEDs connected in series (e.g., a chain of LEDs), a plurality of LEDs connected in parallel, or a suitable combination thereof, depending on the particular lighting system. In addition, each of the emitters 711, 712, 713, 714 may comprise one or more organic light-emitting diodes (OLEDs). For example, the first emitter 711 may represent a chain of red LEDs, the second emitter 712 may represent a chain of blue LEDs, the third emitter 713 may represent a chain of green LEDs, and the fourth emitter 714 may represent a chain of white or amber LEDs. The emitters 711, 712, 713, 714 may be controlled to adjust a brightness (e.g., a luminous flux or an intensity) and/or a color (e.g., a color temperature and/or a color value) of a cumulative light output of the lighting device 700. The emitter assembly 710 may also comprise one or more detectors 716, 718 (e.g., photodiodes) that may produce respective photodiode currents $I_{PD1}$, $I_{PD2}$ (e.g., detector signals) in response to incident light. For example, the first detector 716 may represent a single red, orange or yellow LED or multiple red, orange or yellow LEDs in parallel (e.g., the first detectors 316 of the emitter assembly 300 and/or the first detectors 416 of the emitter assembly 400), and the second detector 718 may represent a single green LED or multiple green LEDs in parallel (e.g., the second detectors 318 of the emitter assembly 300 and/or the second detectors 418 of the emitter assembly 400). The emitter assembly 710 may be mounted on a light-generation printed circuit board of a lighting device assembly of the lighting device 700 (e.g., the printed circuit board 232 of the light-generation module 230 of the lighting device assembly 200).

The lighting device 700 may comprise a power conversion stage 720. The power conversion stage 720 may comprise a power converter circuit 722, which may receive a source voltage, such as an AC mains line voltage $V_{AC}$, via a hot connection H and a neutral connection N. The power converter circuit 722 may generate a DC bus voltage $V_{BUS}$ (e.g., approximately 15-20V) across a bus capacitor CBUS. The power converter circuit 722 may comprise, for example, a boost converter, a buck converter, a buck-boost converter, a flyback converter, a single-ended primary-inductance converter (SEPIC), a Ćuk converter, or any other suitable power converter circuit for generating the bus voltage $V_{BUS}$. The power converter circuit 722 may provide electrical isolation between the AC power source and the emitters 711, 712, 713, 714, and may operate as a power factor correction (PFC) circuit to adjust the power factor of the lighting device 700 towards a power factor of one. The circuitry of the power conversion stage 720 may be mounted to a power printed circuit board that is external to the lighting device assembly that includes the light-generation printed circuit board to which the emitter assembly 710 is mounted.

The lighting device 700 may comprise a light-generation module stage 730. For example, the circuitry of the light-generation module stage 730 may be mounted to the light-generation printed circuit board to which the emitter assembly 710 is also mounted (e.g., the printed circuit board 232 of the light-generation module 230 of the lighting device assembly 200). The light-generation module stage 730 may comprise an LED drive circuit 732 for controlling (e.g., individually controlling) the power delivered to and the luminous flux of the light emitted of each of the emitters 711, 712, 713, 714 of the emitter assembly 710. The LED drive circuit 732 may receive the bus voltage $V_{BUS}$ and may adjust magnitudes of respective LED drive currents $I_{LED1}$, $I_{LED2}$, $I_{LED3}$, $I_{LED4}$ conducted through the emitters 711, 712, 713, 714. The LED drive circuit 732 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 732 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The light-generation module stage 730 may comprise a receiver circuit 734 that may be electrically coupled to the detectors 716, 718 of the emitter assembly 710 for generating respective optical feedback signals $V_{FB1}$, $V_{FB2}$ in response to the photodiode currents $I_{PD1}$, $I_{PD2}$. The receiver circuit 734 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The light-generation module stage 730 may comprise an emitter control circuit 736 for controlling the LED drive circuit 732 to control the intensities of the emitters 711, 712, 713, 714 of the emitter assembly 710. The emitter control circuit 736 may comprise, for example, a microprocessor, a microcontroller, a programmable logic device (PLD), an application specific integrated circuit (ASIC), a field-programmable gate array (FPGA), or any other suitable processing device or controller. The emitter control circuit 736 may generate one or more drive signals $V_{DR1}$, $V_{DR2}$, $V_{DR3}$, $V_{DR4}$ for controlling the respective regulation circuits in the LED drive circuit 732. The emitter control circuit 736 may receive the optical feedback signals $V_{FB1}$, $V_{FB2}$ from the receiver circuit 734 for determining the luminous flux $L_E$ of the light emitted by the emitters 711, 712, 713, 714.

The emitter control circuit 736 may receive a plurality of emitter forward-voltage feedback signals $V_{FE1}$, $V_{FE2}$, $V_{FE3}$, $V_{FE4}$ from the LED drive circuit 732 and a plurality of detector forward-voltage feedback signals $V_{FD1}$, $V_{FD2}$ from the receiver circuit 734. The emitter forward-voltage feedback signals $V_{FE1}$-$V_{FE4}$ may be representative of the magnitudes of the forward voltages of the respective emitters 711, 712, 713, 714, which may indicate temperatures $T_{E1}$, $T_{E2}$, $T_{E3}$, $T_{E4}$ of the respective emitters. If each emitter 711, 712, 713, 714 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 716, 718, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 716, 718.

The lighting device 700 may comprise a lighting device control circuit 740 that may be electrically coupled to the emitter control circuit 736 via a communication bus 742 (e.g., an I²C communication bus). The lighting device control circuit 740 may be configured to control the emitter assembly 710 to control the brightness (e.g., luminous flux) and/or the color (e.g., the color temperature and/or the color value) of the cumulative light emitted by the lighting device 700. The lighting device control circuit 740 may comprise, for example, a microprocessor, a microcontroller, a programmable logic device (PLD), an application specific integrated circuit (ASIC), a field-programmable gate array (FPGA), or any other suitable processing device or controller. The lighting device control circuit 740 may be configured to adjust (e.g., dim) a present intensity $L_{PRES}$ (e.g., a present brightness) of the cumulative light emitted by the lighting device 700 towards a target intensity $L_{TRGT}$ (e.g., a target brightness), which may range across a dimming range of the controllable lighting device, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The lighting device control circuit 740 may be configured to adjust a present color temperature $T_{PRES}$ of the cumulative light emitted by the lighting device 700 towards a target color temperature $T_{TRGT}$, which may range between a cool-white color temperature (e.g., approximately 3100-4500 K) and a warm-white color temperature (e.g., approximately 2000-3000 K). The lighting device control circuit 740 may be configured to adjust a present color value of the cumulative light emitted by the lighting device 700 (e.g., which may be defined by a present x-chromaticity coordinate $X_{PRES}$ and a present y-chromaticity coordinate $Y_{PRES}$) towards a target color value (e.g., which may be defined by a target x-chromaticity coordinate $X_{TRGT}$ and a target y-chromaticity coordinate $Y_{TRGT}$).

The lighting device 700 may comprise a communication circuit 744 coupled to the lighting device control circuit 740. The communication circuit 744 may comprise a wireless communication circuit, such as, for example, a radio-frequency (RF) transceiver coupled to an antenna for transmitting and/or receiving RF signals. The wireless communication circuit may be an RF transmitter for transmitting RF signals and an RF receiver for receiving RF signals. The communication circuit 744 may be coupled to the hot connection H and the neutral connection N of the lighting device 700 for transmitting a control signal via the electrical wiring using, for example, a power-line carrier (PLC) communication technique. The lighting device control circuit 740 may be configured to determine the target intensity $L_{TRGT}$ for the lighting device 700 in response to messages (e.g., digital messages) received via the communication circuit 734.

The lighting device 700 may comprise a memory 746 configured to store operational characteristics of the lighting device 700 (e.g., the target intensity $L_{TRGT}$, the target color temperature $T_{TRGT}$, the target x-chromaticity coordinate $X_{TRGT}$, the target y-chromaticity coordinate $Y_{TRGT}$, the low-end intensity $L_{LE}$, the high-end intensity $L_{HE}$, etc.). The memory 746 may be implemented as an external integrated circuit (IC) or as an internal circuit of the lighting device control circuit 740. The lighting device 700 may comprise a power supply 748 that may receive the bus voltage $V_{BUS}$ and generate a supply voltage $V_{CC}$ for powering the lighting device control circuit 740 and other low-voltage circuitry of the lighting device.

When the lighting device 700 is on, the light source control circuit 740 may be configured to control the emitter assembly 710 to emit light substantially all of the time. The lighting device control circuit 740 may be configured to control the emitter assembly 710 to disrupt the normal emission of light to measure one or more operational characteristics of the emitter assemblies during periodic measurement intervals. For example, during the measurement intervals, the emitter control circuit 736 may be configured to individually turn on each of the different-colored emitters 711, 712, 713, 714 of the emitter assembly 710 (e.g., while turning off the other emitters) and measure the luminous flux of the light emitted by that emitter using one of the two detectors 716, 718. For example, the emitter control circuit 736 may turn on the first emitter 711 of the emitter assembly 710 (e.g., at the same time as turning off the other emitters 712, 713, 714 and determine the luminous flux $L_E$ of the light emitted by the first emitter 711 in response to the first optical feedback signal $V_{FB1}$ generated from the first detector 716. In addition, the emitter control circuit 736 may be configured to drive the emitters 711, 712, 713, 714 and the detectors 716, 718 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter assemblies in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392, 660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392, 663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 700 may be stored in the memory 746 as part of a calibration procedure performed during manufacturing of the lighting device 700. Calibration values may be stored for each of the emitters 711, 712, 713, 714 and/or the detectors 716, 718 of the emitter assembly 710. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 711, 712, 713, 714 using an external calibration tool, such as a spectrophotometer. The values for the emitter forward voltages, photodiode currents, and detector forward voltages may be measured internally to the lighting device 700. The calibration values for each of the emitters 711, 712, 713, 714 and/or the detectors 716, 718 may be measured at a plurality of different drive currents, and/or at a plurality of different operating temperatures.

After installation, the lighting device control circuit 740 of the lighting device 700 may use the calibration values stored in the memory 746 to maintain a constant light output from the emitter assembly 710. The lighting device control circuit 740 may determine target values for the luminous flux to be emitted from the emitters 711, 712, 713, 714 to achieve the target intensity $L_{TRGT}$, the target color temperature $T_{TRGT}$, and/or the target color value (e.g., as defined by the target x-chromaticity coordinate $X_{TRGT}$ and the target y-chromaticity coordinate $Y_{TRGT}$) for the lighting device 700. The lighting device control circuit 740 may determine the magnitudes for the respective drive currents $I_{LED1}$-$I_{LED4}$. for the emitters 711, 712, 713, 714 based on the determined target values for the luminous flux to be emitted from the emitters 711, 712, 713, 714. When the age of the lighting device 700 is zero, the magnitudes of the respective drive currents $I_{LED1}$-$I_{LED4}$ for the emitters 711, 712, 713, 714 may be controlled to initial magnitudes $I_{LED-INITIAL}$.

The light output of the emitter assembly 710 may decrease as the emitters 711, 712, 713, 714 age. The lighting device control circuit 740 may be configured to increase the magnitudes of the drive current IDR for the emitters 711, 712, 713, 714 to adjusted magnitudes $I_{LED-ADJUSTED}$ to achieve the determined target values for the luminous flux of the target intensity $L_{TRGT}$, the target color temperature $T_{TRGT}$, and/or the target color value. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

What is claimed is:

1. An optical system comprising:

an emitter assembly comprising an array of emitters configured to emit light, the array of emitters characterized by an area that is centered about a central axis of the optical system; and an optical structure comprising a body having a light-entry portion configured to receive the light emitted by the emitters, a light-exit portion, and a side wall extending between the light-entry portion and the light-exit portion, the body centered about the central axis of the optical system, the side wall defining a total internal reflection (TIR) surface within the body of the optical structure, the TIR surface configured to reflect light emitted by the emitter assembly towards the light-exit portion;

wherein the light-exit portion comprises a front surface and an octagon-shaped well formed into the front surface, the octagon-shaped well comprising a center surface surrounded by a beveled portion that is configured to refract light that is reflected off of the TIR surface towards the central axis of the optical system, such that light rays that are transmitted from the light-exit portion are substantially collimated.

2. The optical system of claim 1, wherein the octagon-shaped well defines an opening in the front surface of the light-exit portion, the opening having four long sides and four short sides that alternate, such that each of the short sides is connected between two of the long sides.

3. The optical system of claim 2, wherein each of the long sides is straight and parallel to a respective side of the array of the emitters.

4. The optical system of claim 3, wherein each of the short sides bisects a corner of a square formed by the long sides.

5. The optical system of claim 4, wherein each of the short sides is straight.

6. The optical system of claim 4, wherein each of the short sides is curved.

7. The optical system of claim 2, wherein the octagon-shaped well comprises a side wall extending between the front surface of the light-exit portion and the beveled portion of the octagon well.

8. The optical system of claim 7, wherein the side wall is perpendicular to the front surface of the light-exit portion, such that the side wall is aligned with the long sides and the short sides of the opening defined by the octagon-shaped well.

9. The optical system of claim 7, wherein the side wall is configured to offset the beveled portion from the front surface of the light-exit portion to position the beveled portion to refract light that is reflected off of the TIR surface towards the central axis of the optical system, such that light rays that are transmitted from the light-exit portion are substantially collimated.

10. The optical system of claim 1, wherein the beveled portion of the octagon-shaped well is flat and oriented at an angle with respect to the central axis.

11. The optical system of claim 10, wherein the front surface of the light-exit portion and the center surface of the octagon-shaped well are both flat.

12. The optical system of claim 1, wherein the array of emitters of the emitter assembly are mounted to a substrate.

13. The optical system of claim 12, wherein the emitter assembly comprises:

an optical element mounted over the array of emitters for conducting light emitted by the array of emitters, the optical element defining a circular periphery that surrounds the area of the array of emitters, the optical element comprising:

a first circular portion centered about the central axis of the optical system and having a dome shape for increasing an amount of light emitted by the array of emitters that is transmitted from the optical element within the first portion; and a second circular portion located around the first circular portion and extending towards the substrate on which the array of emitters are mounted, the second circular portion having a substantially flat or concave shape and configured to spread light that is transmitted from the optical element within the second circular portion away from the central axis of the optical system, so as to reduce an apparent size of the area of the array of emitters of the emitter assembly.

14. The optical system of claim 1, wherein the TIR surface comprises a first TIR surface, and the light-entry portion of the optical structure defines a recess in the body of the optical structure and a projection extending from the body into the recess, the projection comprising a side wall that defines a second TIR surface within the body of the optical structure, the second TIR surface configured to reflect light emitted by the array of emitters towards the light-exit portion.

15. The optical system of claim 1, wherein the array of emitters is characterized by an area that is square shaped.

16. An optical system comprising:

an emitter assembly comprising an array of emitters configured to emit light, the array of emitters characterized by an area that is centered about a central axis of the optical system; and an optical structure comprising a body having a light-entry portion configured to receive the light emitted by the emitters, a light-exit portion, and a side wall extending between the light-entry portion and the light-exit portion, the body centered about the central axis of the optical system, the side wall defining a total internal reflection (TIR) surface within the body of the optical structure, the TIR surface configured to reflect light emitted by the emitter assembly towards the light-exit portion;

wherein the light-exit portion comprises a front surface and a well formed into the front surface, the well comprising a center surface surrounded by a beveled portion that is configured to refract light that is reflected off of the TIR surface towards the central axis of the optical system, such that light rays that are transmitted from the light-exit portion are substantially collimated, and wherein the well defines an opening in the front surface of the light-exit portion, the opening comprises four long sides, wherein each of the long sides is straight and parallel to a respective side of the array of the emitters.

17. The optical system of claim 16, wherein the beveled portion of the well is flat and oriented at an angle with respect to the central axis.

18. The optical system of claim 16, wherein the opening further comprises four short sides that alternate with the four long sides, such that each of the short sides is connected between two of the long sides.

19. The optical system of claim 16, wherein the emitter assembly comprises:

an optical element mounted over the array of emitters for conducting light emitted by the array of emitters, the optical element defining a circular periphery that surrounds the area of the array of emitters, wherein the array of emitters of the emitter assembly are mounted to a substrate, and wherein the optical element comprising:

a first circular portion centered about the central axis of the optical system and having a dome shape for increasing an amount of light emitted by the array of emitters that is transmitted from the optical element within the first portion; and a second circular portion located around the first circular portion and extending towards the substrate on which the array of emitters are mounted, the second circular portion having a substantially flat or concave shape and configured to spread light that is transmitted from the optical element within the second circular portion away from the central axis of the optical system, so as to reduce an apparent size of the area of the array of emitters of the emitter assembly.

20. The optical system of claim 16, wherein the TIR surface comprises a first TIR surface, and the light-entry portion of the optical structure defines a recess in the body of the optical structure and a projection extending from the body into the recess, the projection comprising a side wall that defines a second TIR surface within the body of the optical structure, the second TIR surface configured to reflect light emitted by the array of emitters towards the light-exit portion.

* * * * *